(12) United States Patent
Ohmori et al.

(10) Patent No.: US 7,542,568 B2
(45) Date of Patent: *Jun. 2, 2009

(54) ENCRYPTION DEVICE A DECRYPTING DEVICE A SECRET KEY GENERATION DEVICE A COPYRIGHT PROTECTION SYSTEM AND A CIPHER COMMUNICATION DEVICE

(75) Inventors: Motoji Ohmori, Hirakata (JP); Makoto Tatebayashi, Takarazuka (JP); Takahiro Nagai, Osaka (JP); Hideshi Ishihara, Katano (JP)

(73) Assignee: Panasonic Corporation, Osaka (JP)

( * ) Notice: Subject to any disclaimer, the term of this patent is extended or adjusted under 35 U.S.C. 154(b) by 752 days.

This patent is subject to a terminal disclaimer.

(21) Appl. No.: 10/490,346

(22) PCT Filed: Sep. 11, 2002

(86) PCT No.: PCT/JP02/09245

§ 371 (c)(1),
(2), (4) Date: Sep. 14, 2004

(87) PCT Pub. No.: WO03/030447

PCT Pub. Date: Apr. 10, 2003

(65) Prior Publication Data

US 2005/0021941 A1    Jan. 27, 2005

(30) Foreign Application Priority Data

Sep. 27, 2001    (JP)    ............................. 2001-298414
Dec. 7, 2001    (JP)    ............................. 2001-374856

(51) Int. Cl.
*H04N 7/167*    (2006.01)

(52) U.S. Cl. .................. 380/201; 380/44; 380/277; 380/255; 726/2; 726/26; 713/158; 713/176; 713/156; 725/115

(58) Field of Classification Search ................. 713/155, 713/156, 158, 193, 169, 176, 189; 380/30, 380/44, 270, 277, 278, 201; 705/54, 55; 725/67, 115; 726/10, 26
See application file for complete search history.

(56) References Cited

U.S. PATENT DOCUMENTS 5,282,249 A    1/1994    Cohen et al.

(Continued)

FOREIGN PATENT DOCUMENTS

JP    10-257047    9/1998

(Continued)

*Primary Examiner*—Nasser G Moazzami
*Assistant Examiner*—Shanto M Abedin
(74) *Attorney, Agent, or Firm*—Wenderoth, Lind & Ponack, L.L.P.

(57) ABSTRACT

An encryption device, a decrypting device, a secret key generation device, a copyright protection system and a cipher communication device including: a CRL memory unit memorizing a CRL, a device key ring memory unit memorizing a specific device key KD_A in every IC card used in a decrypting device, a content key memory unit memorizing a content key Kc, which is a secret key for decrypting content, and a hashing function processing unit calculating a hashing value of the CRL memorized in the CRL memory unit. The devices further including an Ex-OR unit carrying out an exclusive OR between the hashing value and the device key KD_A memorized in the device key ring memory unit, and an Enc unit encrypting the content key Kc memorized in the content key memory unit using an output value of an Ex-OR unit.

25 Claims, 17 Drawing Sheets

U.S. PATENT DOCUMENTS

| | | | |
|---|---|---|---|
| 5,481,609 A | 1/1996 | Cohen et al. | |
| 6,009,174 A * | 12/1999 | Tatebayashi et al. | 380/277 |
| 6,189,096 B1 * | 2/2001 | Haverty | 713/155 |
| 6,581,160 B1 * | 6/2003 | Harada et al. | 713/169 |
| 7,065,648 B1 * | 6/2006 | Kamibayashi et al. | 713/171 |
| 7,073,073 B1 * | 7/2006 | Nonaka et al. | 713/193 |
| 7,106,861 B1 * | 9/2006 | Nishimura et al. | 380/200 |
| 7,219,227 B2 * | 5/2007 | Hori et al. | 713/158 |
| 2002/0107814 A1 * | 8/2002 | Micali | 705/67 |
| 2002/0154772 A1 * | 10/2002 | Morishita et al. | 380/201 |
| 2004/0003239 A1 * | 1/2004 | Ohmori et al. | 713/158 |
| 2004/0078573 A1 * | 4/2004 | Matsuyama | 713/175 |
| 2004/0190389 A1 * | 9/2004 | Nakano et al. | 369/30.03 |
| 2005/0078825 A1 * | 4/2005 | Ohmori et al. | 380/255 |

FOREIGN PATENT DOCUMENTS

| | | |
|---|---|---|
| JP | 10-285156 | 10/1998 |
| JP | 2000-284688 | 10/2000 |
| JP | 3199119 | 6/2001 |
| WO | 95/19672 | 7/1995 |
| WO | 01 11819 | 2/2001 |
| WO | 01/41359 | 6/2001 |
| WO | 01 61591 | 8/2001 |

* cited by examiner

Fig.2

| CRL | | |
|---|---|---|
| file header | name | ○△□△.crl |
| | size | 79KB |
| | type | revoked certificate list |
| | update | 2001/09/07/12:34 |
| general | version | V1 |
| | publisher | ○△□△ |
| | validity starting date | 2001/09/6 |
| | next update due | 2001/09/16 |
| | signature algorithm | md5RSA |
| revoked list | serial number | revoked date |
| | ○××⋯△□ | 2001/05/01 |
| | ○××⋯○□ | 2001/11/29 |
| | ... | ... |

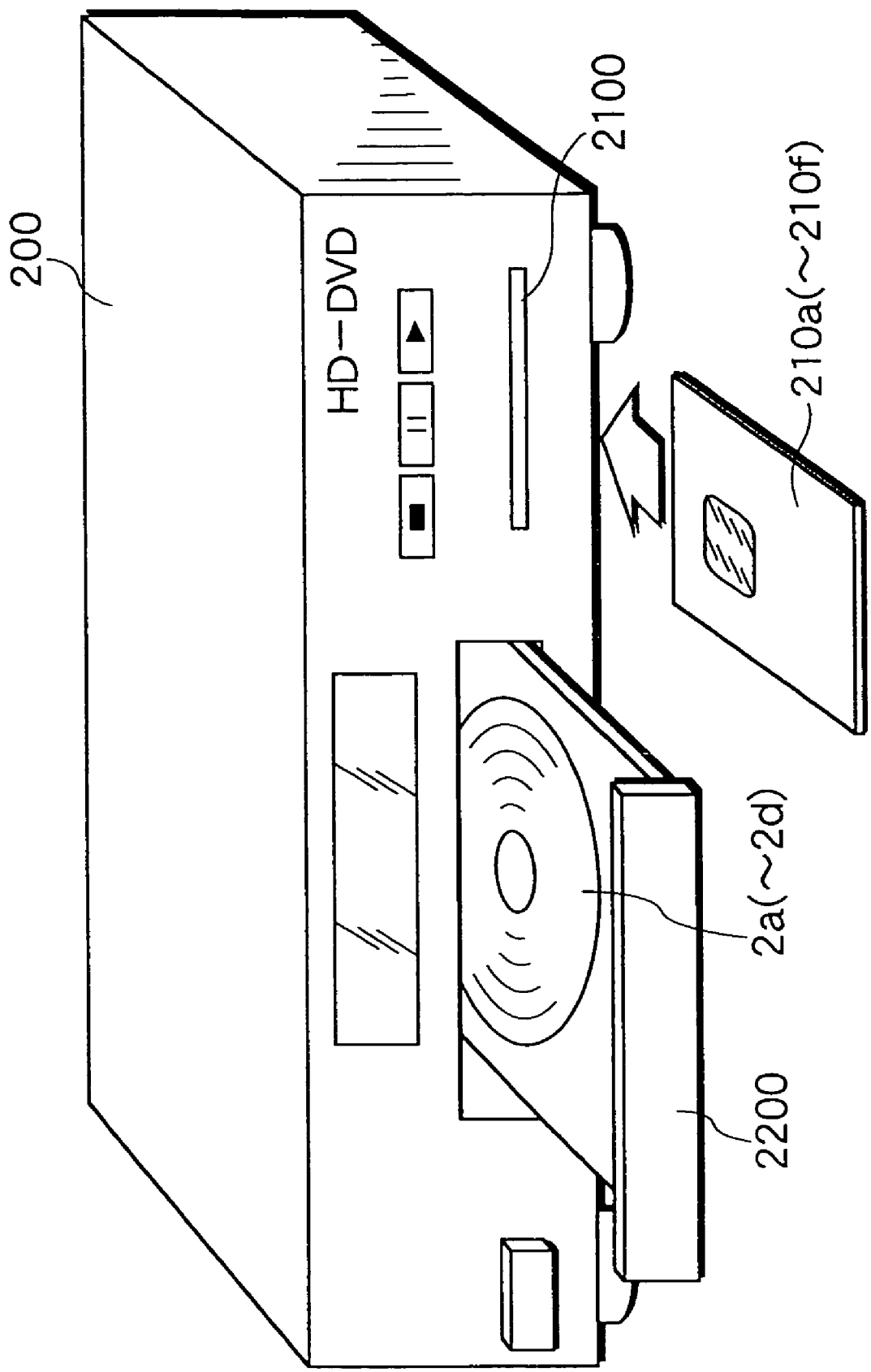

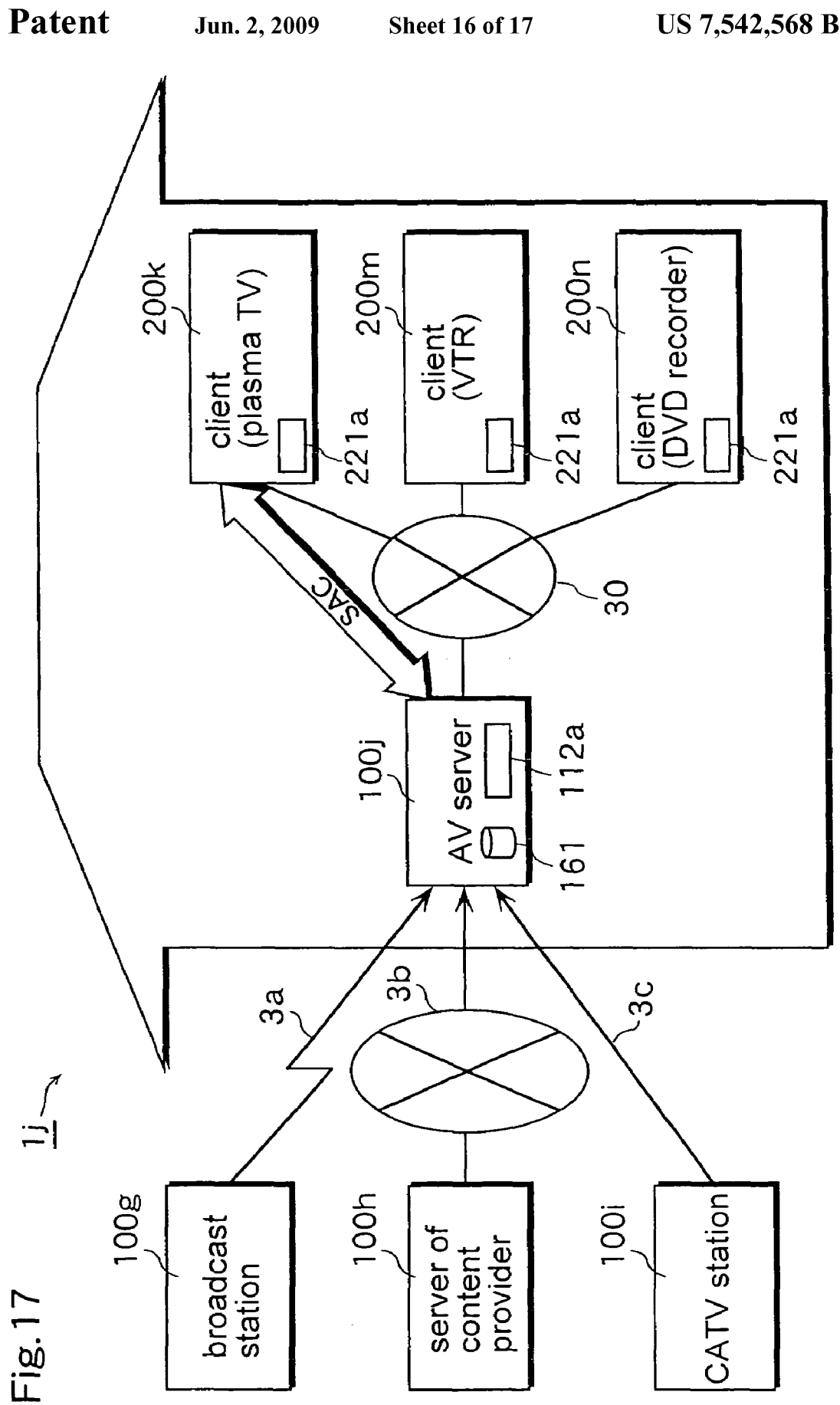

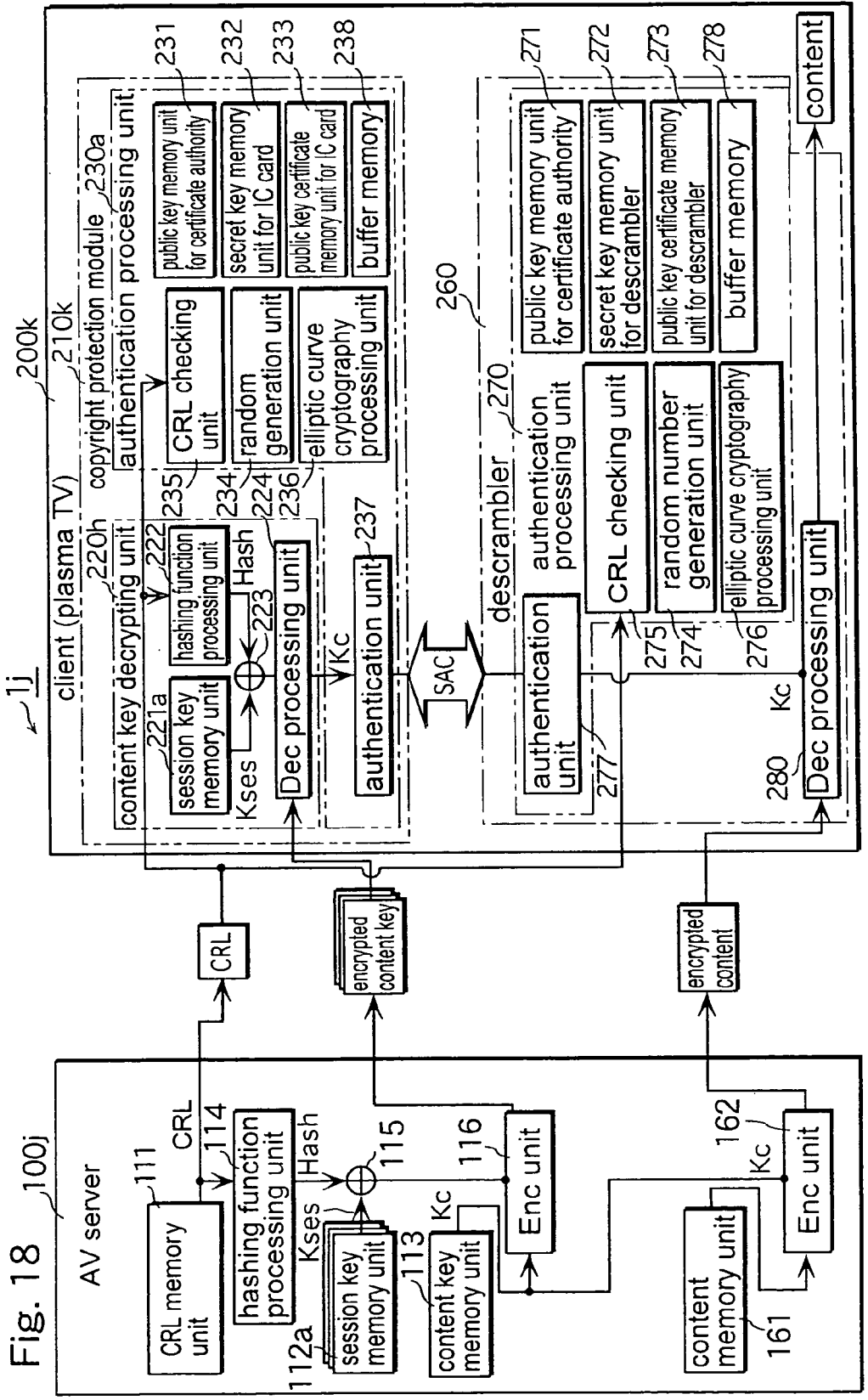

ENCRYPTION DEVICE A DECRYPTING DEVICE A SECRET KEY GENERATION DEVICE A COPYRIGHT PROTECTION SYSTEM AND A CIPHER COMMUNICATION DEVICE

BACKGROUND OF THE INVENTION

1. Field of the Invention

The present invention relates to an encryption device and a decrypting device for protecting copyrights when transmitting digital productions via a recording medium or a transmission medium. More specifically, the present invention relates to a protection technique that is to protect against an attack enacted by is a replacement of a Certificate Revocation List (CRL) specifying a revoked public key certificate.

2. Description of the Related Art

When a digital production is transmitted from a (first) device to another (second) device, prior to the transmission, a computer authentication is conducted to avoid a copyright infringement by an authorized obtainment. The first computer is to authenticate the second computer. In other words, the first computer makes sure that the second computer is a qualified computer to transmit.

For example, a first computer sends a random number to a second computer, then the second computer encrypts the random number with its own secret key (i.e., digital signature) and transmits it to the first computer. Finally, the first computer verifies the transmitted encrypted text (or the digital signature) using the second computer's public key.

However, the authentication using the public key encryption should be based on the condition that the public key itself is not revoked.

Therefore, in recent years, a "public key certificate" for proving that a public key is a qualified key for each user, is issued from an organization or a company called "certificate authority" (CA). Among those issued public key certificates, there are certificates for the users who have a secret key that is expired or stolen, or that have done something illegal. For nullifying those certificates (or notifying other users that those certificates are nullified), a Certificate Revocation List (hereinafter referred to as a "CRL", a "public key certificate revocation list" or an "revocation list"), an information list for specifying the revoked public key certificate is issued.

Accordingly, when authenticating a communication partner with the partner's public key, a public key certificate is obtained from the communication partner, and upon confirmed that the obtained public key certificate is not listed on the CRL, and then the above-mentioned authentication processing is executed so as to avoid transmitting a valuable digital production to an unauthorized communication partner.

There are devices and systems (refer to Japanese patent NO. 3199119) in which key checking is conducted with only referring to the public key certificate, however, such devices and systems cannot cover when there are certificates for the users who have a secret key that is expired or stolen, or have done something illegal, as stated above.

However, it is not possible for every computer to obtain the qualified CRL and check the validity of the public key certificate of the communication partner. As a result, unauthorized use is conducted.

For example, a device, such as a DVD drive device which plays back a DVD (digital Video/Versatile Disc), on which digital works (i.e., movies) are recorded, obtains the qualified CRL via a DVD and reads out the latest CRL from the DVD, and then authenticates the communication partner computer (a computer that operates an integrated playback processing circuit or playback software) with reference to the CRL. In the process of reading out the CRL, there is a possibility that the CRL could be replaced with the old one.

As a result, although a computer is listed on the qualified (i.e., the latest) CRL as a revoked computer, it may be possible for the revoked computer to be transmitted a digital production illegally with a revoked public key that is not listed on the replaced old CRL yet.

Also, when a computer which has already held a CRL obtains a new CRL, it is necessary to compare the two lists to figure out which is the latest, then holds only the latest one, that is, it is necessary to verify accurately which lists should be held.

Accordingly, the first object of the present invention is, in the light of the above-mentioned problem, to provide an encryption device, a decrypting device, a secret key generation device, a copyright protection system and a cipher communication device that can defend from an attack enacted by a replacement of a CRL, and as a result, transmit a digital production safely.

And the second object of the present invention is to provide a cipher communication device that can specify the latest CRL accurately when a new CRL is obtained, and hold only the latest list in place of the old one.

BRIEF SUMMARY OF THE INVENTION

In order to achieve the above first object, an encryption device according to the present invention is an encryption device that encrypts and outputs the digital production to a recording medium or a transmission medium, and comprises of a digital production memory unit operable to memorize a digital production, a first secret key memory unit operable to memorize a first secret key which is used for the encryption of the digital production, a second secret key memory unit operable to memorize a second secret key corresponding to a decrypting device that decrypts an encrypted digital production, a CRL memory unit operable to memorize a CRL which is an information list that specifies a revoked public key certificate, an attribute value calculating unit operable to calculate an attribute value dependent on details of a CRL based on the CRL memorized in the CRL memory unit, a transforming unit operable to transform the second secret key memorized in the second secret key memory unit with the attribute value calculated in the attribute value calculating unit, a first encryption unit operable to encrypt the first secret key memorized in the first secret key memory unit with the second secret key which is transformed by the transforming unit, a second encryption unit operable to encrypt the digital production memorized in the digital production memory unit with the first secret key memorized in the first secret key memory unit and an outputting unit operable to output the CRL memorized in the CRL memory unit, the first secret key encrypted by the first encryption unit and the digital production encrypted by the second encryption unit to the recording medium or the transmission medium.

As a result, the encrypted digital production, the encrypted first secret key which is used for encrypting the digital production, and the CRL are outputted from the encryption device. The encrypted first secret key is not encrypted only with the second secret key which corresponds to the decrypting device, but also with the second secret key on which the details of the CRL have been reflected. Accordingly, when the CRL is replaced, the details of the CRL received by the decrypting device are different from the list reflected on the second secret key held in the decrypting device itself, that is, the second secret key is transformed. As a result, the decrypting device which received the encrypted digital production, the encrypted first secret key and the CRL cannot decrypt the encrypted first secret key to the original first secret key using the second secret key transformed as such. Therefore, the decrypting device cannot decrypt the encrypted digital production right. As a result, the safe transmission of the digital production, having a defending function against an attack enacted by a replacement of the CRL, is realized.

Also, the encryption device mentioned above, may further include a confirmation data outputting unit operable to output a confirmation data which is to be a criterion for confirming whether or not the first secret key decrypted by the decrypting device is a right key. For example, the confirmation data outputting unit outputs a data obtained by encrypting the predetermined fixed-pattern data with the first secret key memorized in the first secret key memory unit as a confirmation data to the recording medium or the transmission medium or the confirmation data outputting unit outputs a data obtained by encrypting the first secret key memorized in the first secret key memory unit with the first secret key as a confirmation data to the recording medium or the transmission medium.

As a result, the decrypting device which received the encrypted digital production outputted from the encryption device, the encrypted first secret key, and the CRL can verify whether or not the CRL has been replaced, that is, whether the first secret key is decrypted rightly or not, so as to avoid useless processing of decrypting the digital production with a wrong key.

Also, an encryption device is an encryption device that encrypts and outputs the digital production to a recording medium or a transmission medium, and comprises a digital production memory unit operable to memorize the digital production, a first secret key memory unit operable to memorize a first secret key which is used for the encryption of the digital production, a second secret key memory unit operable to memorize a second secret key corresponding to a decrypting device that decrypts an encrypted digital production, a CRL memory unit operable to memorize a CRL which is an information list that specifies a revoked public key certificate, a first encryption unit operable to encrypt the first secret key memorized in the first secret key memory unit with the second secret key which is memorized in the second secret key memory unit, an attribute value calculating unit operable to calculate an attribute value dependent on details of a CRL based on the CRL memorized in the CRL memory unit, a transforming unit operable to transform the first secret key memorized in the first secret key memory unit with the attribute value calculated in the attribute value calculating unit, a second encryption unit operable to encrypt the digital production memorized in the digital production memory unit with the first secret key transformed by the transforming unit and an outputting unit operable to output the CRL memorized in the CRL memory unit, the first secret key encrypted by the first encryption unit and the digital production encrypted by the second encryption unit to the recording medium or the transmission medium.

As a result, the encrypted digital production, the encrypted first secret key which is used for encrypting the digital production, and the CRL are outputted from the encryption device. The encrypted digital production is not encrypted only with the first secret key but also with the first secret key on which the details of the CRL has been reflected. Accordingly, when the CRL is replaced, the details of the CRL received by the decrypting device are different from the list reflected on the first secret key held in the decrypting device itself, that is, the first secret key is transformed. As a result, the decrypting device which received the encrypted digital production, the encrypted first secret key and the CRL cannot decrypt the encrypted digital production rightly using the first secret key transformed as such. As a result, the safe transmission of the digital production, having a defending function against an attack enacted by a replacement of the CRL, is realized.

Also, as mentioned above, it is possible for the decrypting device, which received the encrypted digital production outputted from the encryption device, the encrypted first secret key and the CRL, to judge whether or not the CRL is replaced, that is, whether the secret key used for the encryption of the digital production is rightly decrypted or not by outputting a first secret key with an attachment of a confirmation data of a CRL, on which the first secret key has been reflected, from the encryption device, so as to avoid an useless processing of decrypting the digital production with a wrong key.

In order to achieve the above second object, a cipher communication device according to the present invention is a cipher communication device that establishes a cipher communication with a partner device using a public key of the partner device, and comprises of a memory unit operable to memorize a CRL, which is an information list for specifying a revoked public key certificate, an obtaining unit operable to obtain a new CRL, a storage unit operable to compare a size of an obtained CRL and the CRL memorized in the memory unit, and when the obtained CRL is larger in size, memorizes the obtained CRL to the memory unit and updates, and a communication unit operable to judge a key validity of a partner device with referring to the CRL memorized in the memory unit, and when the public key is not revoked, establishes a cipher communication with the partner device using the public key.

It may be possible for the above function of the storage unit to change to compare the number of the certificate that is listed on the obtained CRL with the number of the certificate that is listed on the CRL memorized in the above memory unit, and when the certificate, listed on the obtained CRL, is large in number, memorizes it to the above memory unit and updates.

As a result, since the number of the public key certificate listed on the CRL is increased as the time goes by, the cipher communication device can always hold a CRL that is large in size (or large in registration number), that is, a latest list.

The present invention, as stated above, realizes the digital production to be transmitted safely, against an attack of a replacement of the CRL. The practical value for the present invention is extremely high in terms of delivering/distributing of the digital production via a transmission line such as Internet or a recording medium such as DVD, which is active in these days.

The present invention can be realized as a decrypting device which corresponds to the above encryption device or a secret key generation device, realized as a copyright protection system including the encryption device and the decrypting device, realized as an encryption method with steps of the characteristic unit that is comprised of the encryption device, the decrypting method or the cipher communication method, or realized as a program for having the computers to execute above steps. In addition, needless to say, the program according to the present invention can be marketed via a recording medium such as a DVD or a transmission medium such as Internet.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 2 is a diagram that shows a constructional example of the CRL.

FIG. 12 is an external view of the HD-DVD player for which the decrypting devices 200a to 200f for the recording medium according to the first and the second embodiments are applied.

FIG. 17 is a block diagram that shows an overall configuration copyright protection system which establishes a cipher communication of the contents via small-scale home LAN.

FIG. 18 is a block diagram that shows a construction of the AV server 100j and the plasma TV 200k of FIG. 17.

DETAILED DESCRIPTION OF THE INVENTION

The following is an explanation of the copyright protection system according to the embodiments of the present invention with reference to figures.

The First Embodiment

Figure 1:
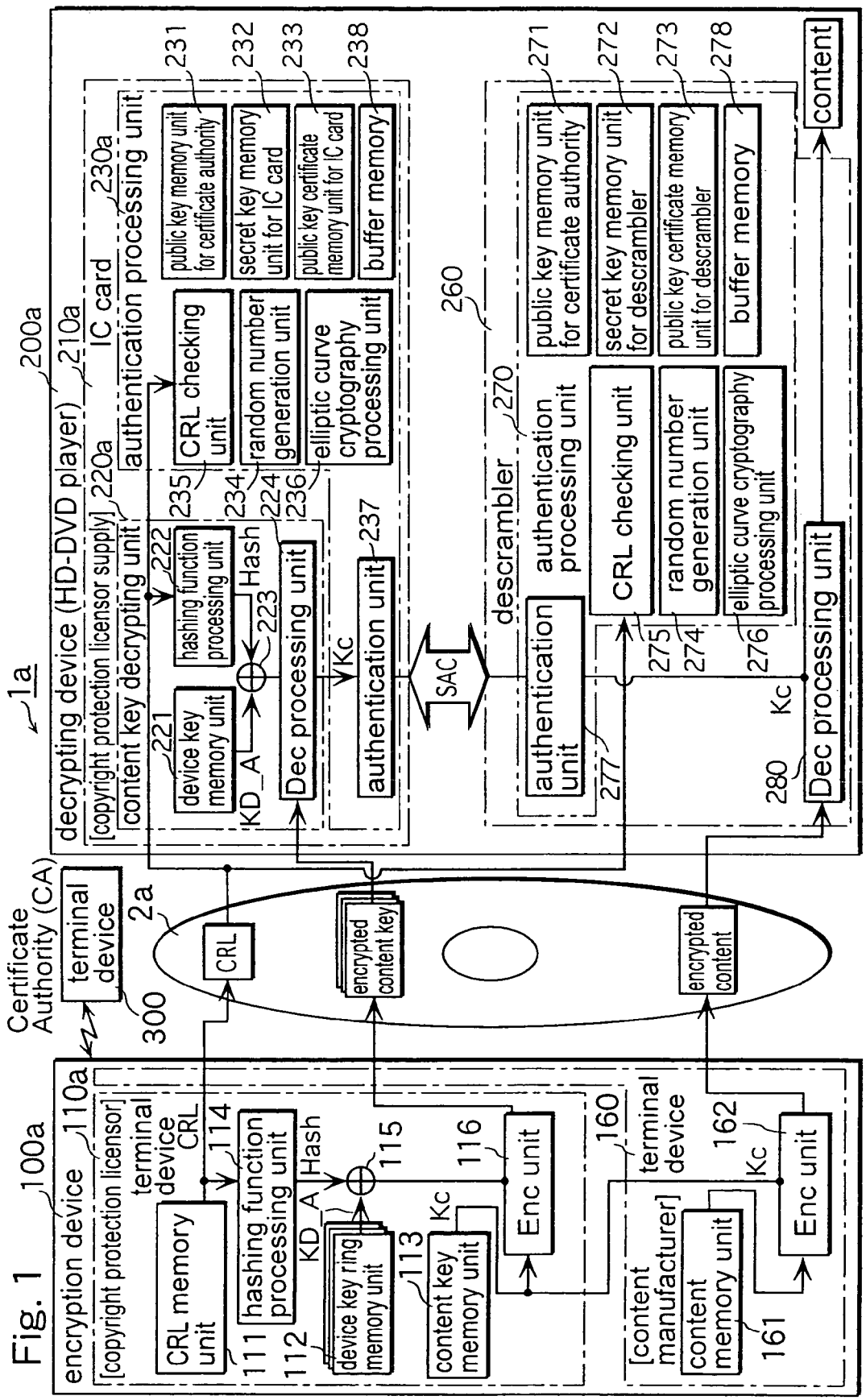
FIG. 1 is a functional block diagram that shows an overall configuration of the recording copyright medium protection system 1a according to the first embodiment.

FIG. 1 is a functional block diagram that shows an overall configuration of the recording medium copyright protection system 1a according to the first embodiment.

A recording medium copyright protection system 1a is a system that records a content encrypted on a DVD 2a as a recording medium, or reads out the encrypted content from the DVD 2a and decrypts it. The system includes an encryption device 100a that memorizes a content encrypted on the DVD 2a, a decrypting device 200a that reads out the encrypted content from the DVD 2a and decrypts it, and a terminal device 300 that is used by a Certificate Authority (CA) issuing a CRL, etc.

The encryption device 100a comprises two terminal devices, the terminal device 110a that the copyright protection licensor uses and a terminal device 160 that a content manufacturer uses.

The decrypting device 200a, for example, is an HD-DVD player with the ability to reproduce a content of a picture level HD (1125i/750p), and includes an IC card 210a supplied by a copyright protection licensor, a descrambler 260 for the player manufacturer and a DVD-ROM drive (not shown in the Figure) which reads out the encrypted content from the DVD 2a.

The terminal device 110a that the copyright protection licensor uses is a computer device that provides information for the decrypting device 200a to have a copyright protection, that is, to provide a CRL, a content key for decrypting the content, and an encrypted content key ring. It comprises a CRL memory unit 111, is a device key ring memory unit 112, a content key memory unit 113, a hashing function processing unit 114, an Ex-OR unit 115 and an Enc unit 116.

The CRL memory unit 111 accesses the terminal device 300 regularly via a communication network, i.e., Internet, etc, and updates/memorizes a latest CRL that the Certificate Authority (CA) provides. The CRL, as shown in FIG. 2, includes a "file header" field, a "general" field and a "revoked list" field. In the area of the "file header", a "name" of the file ○△□△.crl, a "size" of the file 79 KB, a "type" of the file revoked certificate list and an "update" of the file 2001/09/07/12:34 are included. Also, in the area of the "general" field, a "version" V1, "publisher" ○△□△, "validity start date" 2001/09/06, a "next update due date" 2001/09/16 and a "signature algorithm" md5RSA are included. Also, in the area of the "revoked list", record of a "serial number" for a revoked certificate and a "revoked date" are described in a text form. Since the CRL gives a monotone increase as the time goes by, the newer the CRL is, the larger the number of available entries (registration units for the CRL) within the CRL identifying revoked certificate serial numbers. It has a characteristic that the size of the file increases monotonously.

The device key ring memory unit 112 memorizes a device key ring KD_A (i.e. 128 bit) that is specific to every IC card 210a supplied by the copyright protection licensor, in advance.

The content key memory unit 113 memorizes a content key Kc (i.e. 128 bit), which is a secret key for encrypting a predetermined content, for example, music or movie.

The hashing function processing unit 114 is a processing unit that compresses a variable length of the CRL data memorized in the CRL memory unit 111, and converts it to a fixed length (i.e. 128 bit) data (hashing value Hash) based on a hashing function. It converts based on a SHA-1 (Secure Hash Algorithm-1) or MD5, for example.

In the Ex-OR unit 115, an exclusive OR between the hashing value Hash calculated in the hashing function processing unit 114 and each device key KD_A memorized in the device key ring memory unit 112 is carried out (the each device key KD_A is transformed with the hashing value).

The Enc unit 116 outputs the content key Kc memorized in the content key memory unit 113 to the Ex-OR unit 115, that is, encrypts with an exclusive OR between the hashing value Hash and the each device key KD_A and generates an encryption content key ring.

Additionally, the hashing function processing unit 114 and the Ex-OR unit 115 in the terminal device 110a transforms the device key KD_A using the CRL memorized in the CRL memory unit 111. This is because by encrypting the content key Kc with the transformed device key KD_A, it enables a relationship between the encrypted content key outputted from the Enc unit 116 and the CRL. By doing so, it is defaceable from an attack enacted by replacing a CRL at the time of the decrypting processing in a decrypting device 200a, as described later.

The terminal device 160, used by the content manufacturer, is a write device that records a CRL, which is passed from the terminal device 110a, or the encrypted content key ring, to the DVD 2a. The terminal device 160 includes a content memory unit 161 and an Enc unit 162.

The content memory unit 161 memorizes a predetermined content, for example, music or movie content.

The Enc unit 162 encrypts a content memorized in the content memory unit 161 with a content key Kc passed from the terminal device 110a and generates an encrypted content.

As stated above, when the DVD 2a is manufactured in the encryption device 100a which includes two terminal devices 110a and 160, the terminal device 110a reads out the CRL from the CRL memory unit 111. The read out CRL is passed to the hashing function processing unit 114 and the terminal device 160. The hashing function processing unit 114 calculates the hashing value Hash of the CRL and passes it to the Ex-OR unit 115. The Ex-OR unit 115 reads out the device key KD_A, the content key Kc, etc., one by one from the device key ring memory unit 112 and calculates the exclusive OR with the hashing value Hash right after the other, then outputs each exclusive OR value to the Enc unit 116. The terminal device 110a reads out the content key Kc from the content key memory unit 113 and passes it to the Enc unit 116 and the terminal device 160. The Enc unit 116 encrypts the passed content key Kc with each exclusive ORs outputted from the Ex-OR unit 115. More specifically, the Enc unit 116 encrypts the content key Kc with an exclusive OR between each value of the device key KD_A and the hashing value Hash. As a result, the Enc unit 116 generates a plurality of the encrypted content keys and passes them in a bunch to the terminal device 160.

The terminal device 160 writes the CRL passed from the terminal device 110a and the encrypted content key ring to the DVD 2a. And then the encrypted content generated by the Enc unit 162 writes to the DVD 2a. The DVD 2a, generated as such, is sold to users with the encrypted content in a condition that the encrypted content key in a bunch and the latest CRL in a bind.

On the other hand, an IC card 210a of the decrypting device 200a, which decrypts such DVD 2a, is comprised of a module (TRM: Tamper Resistance Module) that is used for preventing the computer program from its deliberate change and protecting a copyright by eliminating an illegal descrambler which is listed on the CRL. In other words, the IC card 210a includes a content key decrypting unit 220a which obtains a key for decrypting the encrypted content based on the CRL bound to the DVD 2a and an authentication processing unit 230a that checks whether a communication partner (descrambler 260) is revoked or not, and at the same time, sets a SAC (Secure Authentication Channel) between the descrambler 260 with bilateral authentication form.

The authentication processing unit 230a includes a public key memory unit for the certificate authority (CA) 231, a secret key for the IC card memory unit 232, a public key certificate memory unit for the IC card (the copyright licensor) 233, a random number generation unit 234, a CRL checking unit 235, an elliptic curve cryptography (ECC) processing unit 236, an authentication unit 237 and a buffer memory 238.

The public key memory unit for the certificate authority (CA) 231 memorizes a public key for authority PK_CA used for decrypting a digital signature of the Certificate Authority (CA) in advance.

The secret key memory unit for the IC card 232 memorizes a secret key SK_A for the IC card that is specific to an IC card used for own digital signature by the IC card 210a supplied by the copyright protection licensor in advance.

Figure 3:
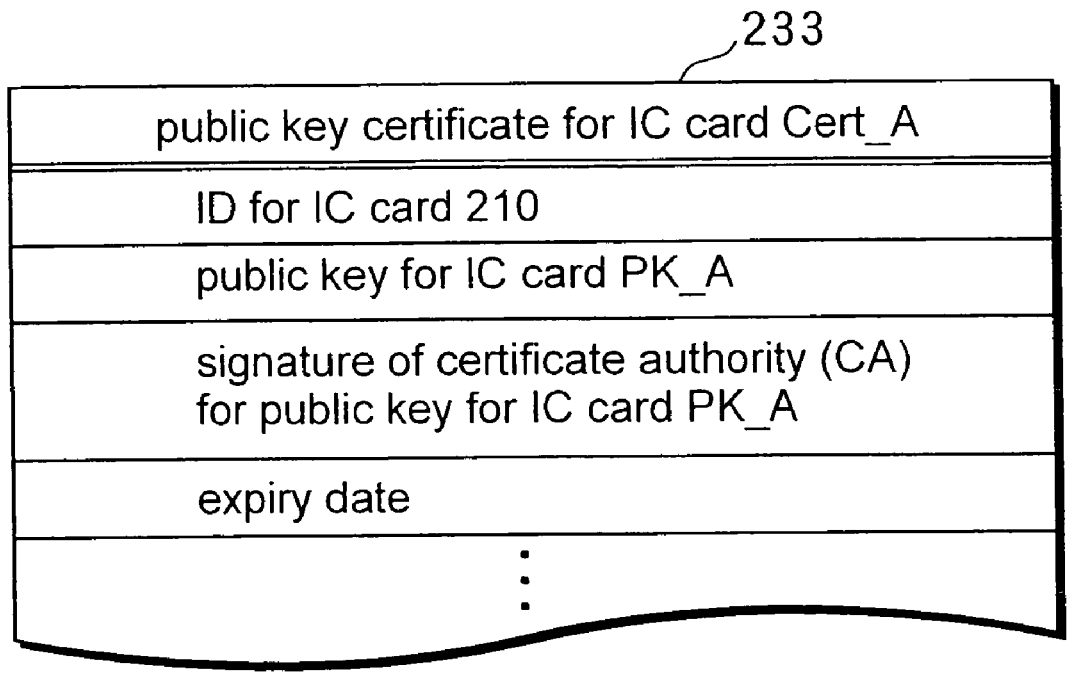
FIG. 3 is a diagram that shows a constructional example of the public key certificate for the copyright protection licensor.

The public key certificate memory unit for the IC card 233 memorizes a public key certificate for an IC card Cert_A which is a document that the Certificate Authority (CA) was to prove that the public key PK_A belongs to the IC card 210a. The public key certificate for the IC card Cert_A, as shown in FIG. 3, includes an ID for the IC card 210a (copyright protection licensor), a public key for the IC card for a secret key for IC card SK_A, a CA's signature for the public key for the IC card PK_A, an expiry date (for the certificate), and thereof.

The random number generation unit 234 generates a random number (i.e., 128 bit) as a time modulation value.

The CRL checking unit 235 checks whether or not the CRL includes the partner's (descrambler 260) ID.

The Elliptic Curve Cryptography (ECC) processing unit 236 executes an encryption processing (i.e., 256 bit processing unit) is based on the elliptical curve when the authentication of the SAC is set.

The authentication unit 237 is a communication interface that communicates with the descrambler 260 via the SAC.

The buffer memory 238 holds temporary data such as a random number generated from the random number generation unit 234 or data that the Elliptic Curve Cryptography (ECC) processing unit 236 generates.

The content key decrypting unit 220 includes a device key memory unit 221, a hashing function processing unit 222, an Ex-OR unit 223 and a Dec processing unit 224.

The device key memory unit 221 memorizes a specific device key KD_A (it is a secret key, i.e., AES128 bit key) into the IC card 210a.

The hashing function processing unit 222 is the same construction with the hashing function processing unit 114 of the terminal device 110a and calculates a hashing value Hash (i.e., 128 bit) of the CRL bound to the DVD 2a.

The Ex-OR unit 223 calculates an exclusive OR between a hashing value Hash calculated in the hashing function processing unit 222 and each device key KD_A memorized in the device key memory unit 221 (transforms the each device key KD_A with the hashing value).

The Dec processing unit 224 generates a content key Kc by decrypting its own encrypted content key memorized in a predetermined place inside the encrypted content key ring bound to DVD 2a with an exclusive OR value between the device key KD_A and the hashing value Hash.

The descrambler 260, the same construction with the IC card 210a, is configured with a module used for preventing an illegal tamper of the computer program, which includes an authentication processing unit 270 for checking whether or not a communication partner (IC card 210a) is revoked with the CRL, and for setting a SAC between the IC card 210a in a bilateral authentication form, and a Dec processing unit 280 for decrypting an encrypted content read out from the DVD 2a with a content key passed from the IC card 210a and for obtaining a content.

The authentication processing unit 270 comprises a public key memory unit for the certificate authority (CA) 271, a secret key memory unit for the descrambler 272, a public key certificate memory unit for the descrambler (player manufacturer) 273, an random number generation unit 274, a CRL checking unit 275, an Elliptic Curve Cryptography (ECC) processing unit 276, an authentication unit 277 and a buffer memory 278.

The public key memory unit for the certificate authority (CA) 271 memorizes the public key for the certificate authority (CA) of the certificate authority (CA) PK_CA in advance.

The secret key memory unit for the descrambler 272 is supplied by the HD-DVD player 200 manufacturer and memorizes a specific secret key for the descrambler SK_i which is used for an own signature for the descrambler 260.

Figure 4:
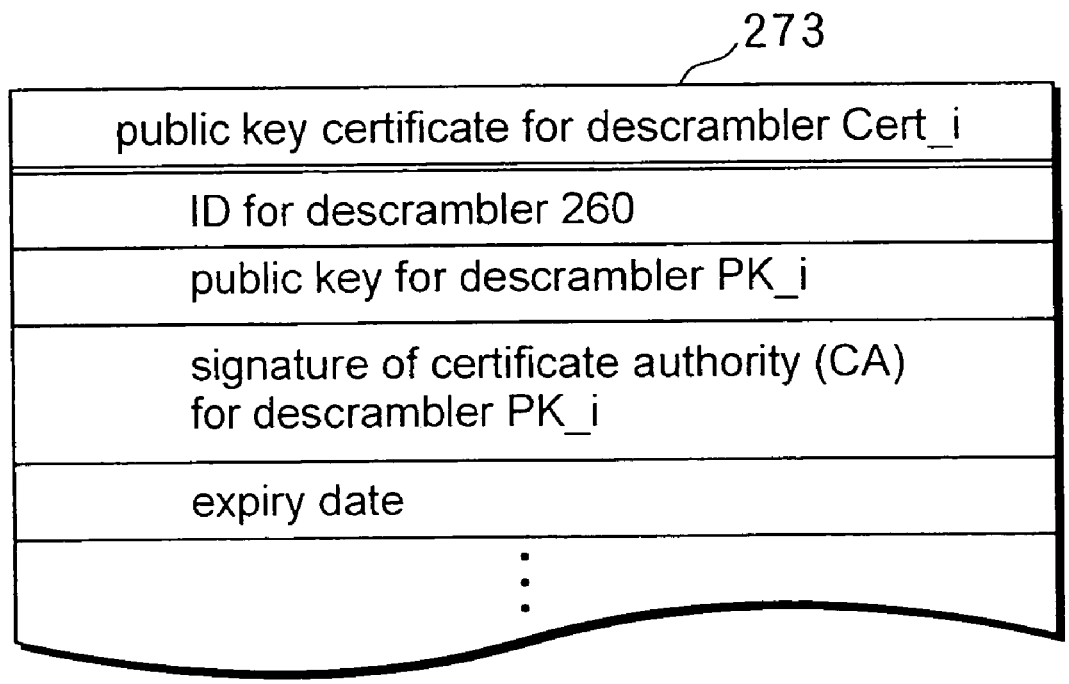
FIG. 4 is a diagram that shows a constructional example of the public key certificate for the manufacturer of the player.

The public key certificate memory unit for the descrambler 273 memorizes a public key certificate for the descrambler Cert_i which is a document that the certificate authority (CA) proves that the public key PK_i belongs to the player manufacturer. The certificate descrambler Cert_i, as shown in FIG. 4, includes an ID (serial numbers for a certificate) of the descrambler 260 (the player manufacturer), a public key for the descrambler PK_i for a secret key for the descrambler SK_i, a digital signature of the certificate authority (CA) for the secret key for the descrambler PK_i and an expiry date (for the certificate).

The random number generation unit 274 generates a random number (i.e., 128 bit) as a time modulation.

The CRL checking unit 275 checks whether or not a partner (IC card 210a) ID number is included in the CRL.

The Elliptical Curve Cryptography (ECC) processing unit 276 executes an encryption processing (i.e., 256 bit processing unit) based on the elliptical curve when an authentication of the SAC is set.

The authentication unit 277 is a communication interface which communicates with the IC card 210a via the SAC.

The buffer memory 278 holds temporary data such as a random number generated from the random number generation unit 234 or data that the Elliptical Curve Cryptography (ECC) processing unit 276 generated.

Figure 5:
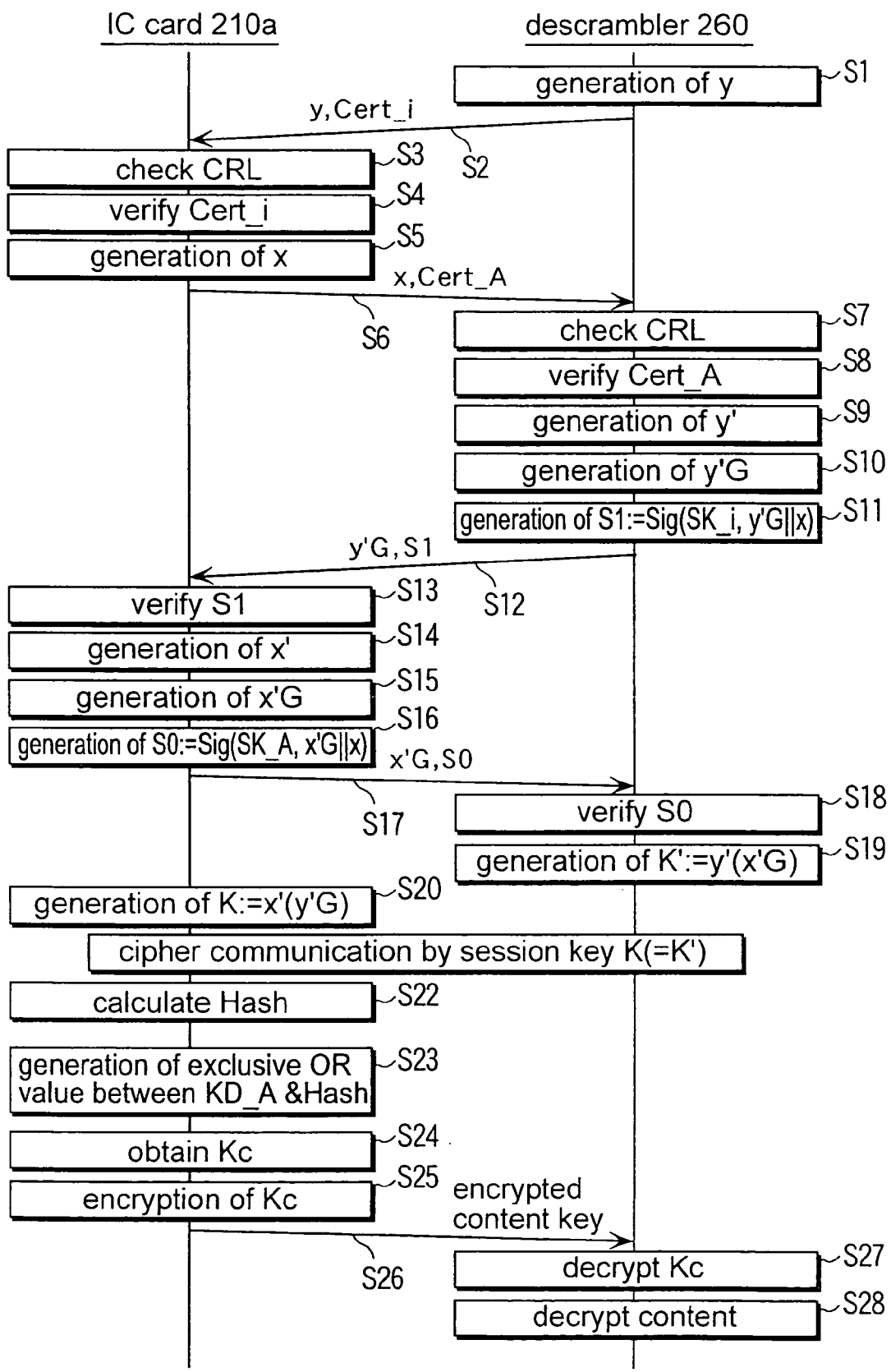
FIG. 5 is a diagram that shows the sequence of the processing conducted between the IC card 210a in the decrypting device 200a and the descrambler 260.

Reference is now made to FIG. 5, which illustrates a SAC setting between the IC card 210a and the descrambler 260, and a sequence of a decrypting for the encrypted content recorded on the DVD 2a. FIG. 5 is a diagram that shows the sequence of the processing conducted between the IC card 210a in the decrypting device 200a and the descrambler 260.

When a user instructs to playback the content of the DVD 2a, the random number generation unit 274 of the descrambler 260 generates a first random number y (i.e., 128 bit) and memorizes it to the buffer memory 278 (S1). The authentication unit 277 of the descrambler 260 reads out the first random number y memorized in the buffer memory 278 and a public key certificate for the descrambler Cert_i memorized in the public key certificate memory unit for the descrambler 273, and then sends them to the IC card 210a (S2).

The authentication unit 237 in the IC card 210a stores the first random number y received from the descrambler 260 and the public key certificate for the descrambler Cert_i in the buffer memory 238. The CRL checking unit 235 checks whether or not the descrambler 260 is revoked based on the CRL passed from the HD-DVD player 200a (S3). More specifically, the checking is conducted based on whether or not the fact that the ID for the descrambler 260 is listed on the CRL. When the descrambler 260 is not revoked, the authentication unit 237 verifies the public key certificate Cert_i with the public key of the certificate authority (CA) PK_CA (S4). More specifically, the digital signature of the public key authority included in the public key certificate for the descrambler Cert_i is decrypted with the public key of the certificate authority (CA) PK_CA, and a verification, of whether the public key certificate for the descrambler Cert_i is sure to belong to the descrambler 260, is conducted. After the verification, the random number generation unit 234 generates the first random number x (i.e. 128 bit) and stores it to the buffer memory unit 238 (S5). The authentication unit 237 reads out the first random number x memorized in the buffer memory 238 and the public key certificate for the IC card Cert_A memorized in the public key certificate memory unit for the IC card 233, and send them to the descramble 260 (S6).

In the descrambler 260, after memorizing the first random number x received from the IC card 210a and the public key certificate for the IC card Cert_A to the buffer memory 278, the CRL checking unit 275 checks whether or not the IC card 210a is revoked based on the CRL passed from a HD-DVD player 200a (S7). In other words, the checking is made by judging whether or not an ID of the IC card 210a is listed on the CRL. When it isn't revoked, the authentication unit 277 verifies the public key certificate for the IC card Cert_A with the public key of the certificate authority (CA) PK_CA (S8). In other words, the authentication unit 277 decrypts the digital signature of the public key authority included in the key public certificate for the IC card Cert_A and the verification, of whether or not the public key certificate for the IC card Cert_A is sure to belong to the IC card 210a, is conducted. After the verification, the random number generation unit 274 generates the second random number y' (i.e. 128 bit), and memorizes it to the buffer memory 278 (S9). The Elliptical Curve Cryptography (ECC) processing unit 276 multiplies the second random number y' and a base point G (constants) on an elliptic curve, thus, generates an y'G. Then the y'G is memorized in the buffer memory 278 (S10). Next, the authentication unit 277 generates a digital signature S1:=Sig (SK_i, y'G||x) that corresponds to the multiplication of y'G and memorizes the digital signature S1 to the buffer memory 278 (S11). This digital signature is put by signing the secret key SK_i into a bit connection of the multiplication of y'G and the first random x. The symbol "||" stands for a bit connection, which is, indicating the y'G and the random number x are connected to the digit direction resulted in 256 bits (i.e., y'G to be upper 128 bits, and random x to be lower 128 bits). After the memorizing of the digital signature S1 is finished, the authentication unit 277 sends the multiplication of the y'G and the digital signature S1, which corresponds to the multiplication of the y'G, to the IC card 210a (S12).

The authentication unit 237 in the IC card 210 stores a y'G and a digital signature S1, which corresponds to y'G, to the buffer memory 238, and after that, verifies whether or not the digital signature S1 is the digital signature of the descrambler 260 that corresponds to the y'G||x using the public key for the descrambler PK_i obtained from the public key certificate for the descrambler Cert_i(S13). In other words, the verification is conducted by decrypting the digital signature S1 using the public key for the descrambler PK_i, and separates a bit connection between the y'G and the random number x. This enables confirmation that the communication partner (descrambler 260) is not an illegal partner.

After the verifications mentioned above, the random number generation unit 234 in the IC card 210a generates a second random number x' and memorizes it to the buffer memory unit 238 (S14). The Elliptical Curve Cryptography (ECC) processing unit 236 multiplies the second random number x' and a base point G (constants) on an elliptic curve and thus generates a x'G. Then the x'G is memorized in the buffer memory 238 (S15). Next, the authentication unit 237 generates a digital signature S0:=Sig (SK_A, x'G||y), which corresponds to the multiplication of the x'G, and memorizes the digital signature S0 to the buffer memory 238 (S16). This digital signature is put, by signing the secret key SK_A, into a bit connection of the multiplication of x'G and the first random number y. After the memorization of the digital signature, the authentication unit 237 sends the multiplication of the x'G and the digital signature S0 to the descrambler 260 (S17).

The authentication unit 277 in the descrambler 260 memorizes the multiplication of the x'G received from the IC card 210a and the digital signature S0 to the buffer memory 278. After that, the authentication unit 277 verifies whether the digital signature S0 is the digital signature of the descrambler 260, which corresponds to the x'G||y, using the public key for the descrambler PK_A obtained from the public key certificate for the descrambler Cert_A (S18). In other words, the verification is conducted by decrypting the digital signature S1 using the public key for the descrambler PK_i, and separates a bit connection between the y'G and the random number x. This enables confirmation that the communication partner (descrambler 260) is not an unauthorized user.

After the authentication unit 277 in the descrambler verifies that the IC card 210a is not revoked, nor wire tapped, calculates K'=y' (x'G) by multiplying the second random number y' (i.e., 128 bit) generated in a self side which is memorized in the buffer memory 278 and the result of the multiplication of x'G obtained from the communication partner, and memorizes the result K' as a session key in the buffer memory 278 (S19).

On the other hand, after the authentication unit 237 in the IC is card 210a verifies that the descrambler 260 is not revoked, nor wire tapped, calculates K'=x' (y'G) by multiplying the second random number x' (i.e., 128 bit) generated in a self side which is memorized in the buffer memory 238 and the result of the multiplication of y'G obtained from the communication partner, and memorizes the result K as a session key in the buffer memory 238 (S20).

As a result, the IC card 210a and the descrambler 260 can hold the same value key K (=K'), subsequently they can establish an cipher communication (S21) using the K(=K') as a session key.

After generating of the session key K, the content key decrypting unit 220a in the IC card 210a executes a content key decrypting processing. In this processing, the hashing function processing unit 222 calculates a hashing value Hash of the CRL passed from the HD-DVD player 200a in the first place (S22). Next, the Ex-OR unit 223 carries out an exclusive OR between own device key KD_A of the IC card 210a memorized in the public key memory unit for certificate authority (CA) 231 and the hashing value Hash (S23). The Dec processing unit 224 decrypts the encrypted content key with the derived exclusive OR value, obtains the content key Kc (S24) and passes the content key Kc to the authentication unit 237, then the content key decrypting processing is finished. After the content key Kc is given, the authentication unit 237 encrypts it with the session key K (S25) and sends it to the descrambler 260 via the SAC (S26). This prevents the content key Kc from wiretapping.

The authentication unit 277 in the descrambler 260 decrypts the encrypted content key received from the IC card 210a using the session key K', obtains the content key Kc (S27) and passes the content key Kc to the Dec processing unit 280. The descrambler 260 decrypts the encrypted content with the content key Kc received from the authentication unit 277 and obtains the content (S28). This enables the content to be decrypted with protecting the copyright.

Alternatively, it may be possible to replace the IC card 210a and descrambler 260 with HD-DVD player 200a, and the CRL bounded to DVD 2a with the CRL for which the self key is not revoked yet. In this case, the SAC is set as same with the above mentioned case and can go on to the cipher communication step (S21) using the session key.

In this first embodiment, the CRL and the encrypted content key ring encrypted with information associated with the hashing value Hash of the CRL are to be bounded to the DVD 2a. For this reason, when the case that the CRL is replaced, the hashing value Hash of the replaced CRL and the hashing value Hash of the CRL bound to the DVD 2a do not match in its value. As a result, it is impossible to obtain a qualified content key Kc by decrypting an encrypted content using the hashing value Hash of the replaced CRL. For obtaining the qualified content key Kc for decrypting the encrypted content, it is necessary to pass the CRL bound to the DVD 2a in return.

Accordingly, it is possible to intensify the copyright protection by eliminating the decrypting device 200a which conducts an illegal operation such as a replacement of the CRL.

The Second Embodiment

Figure 6:
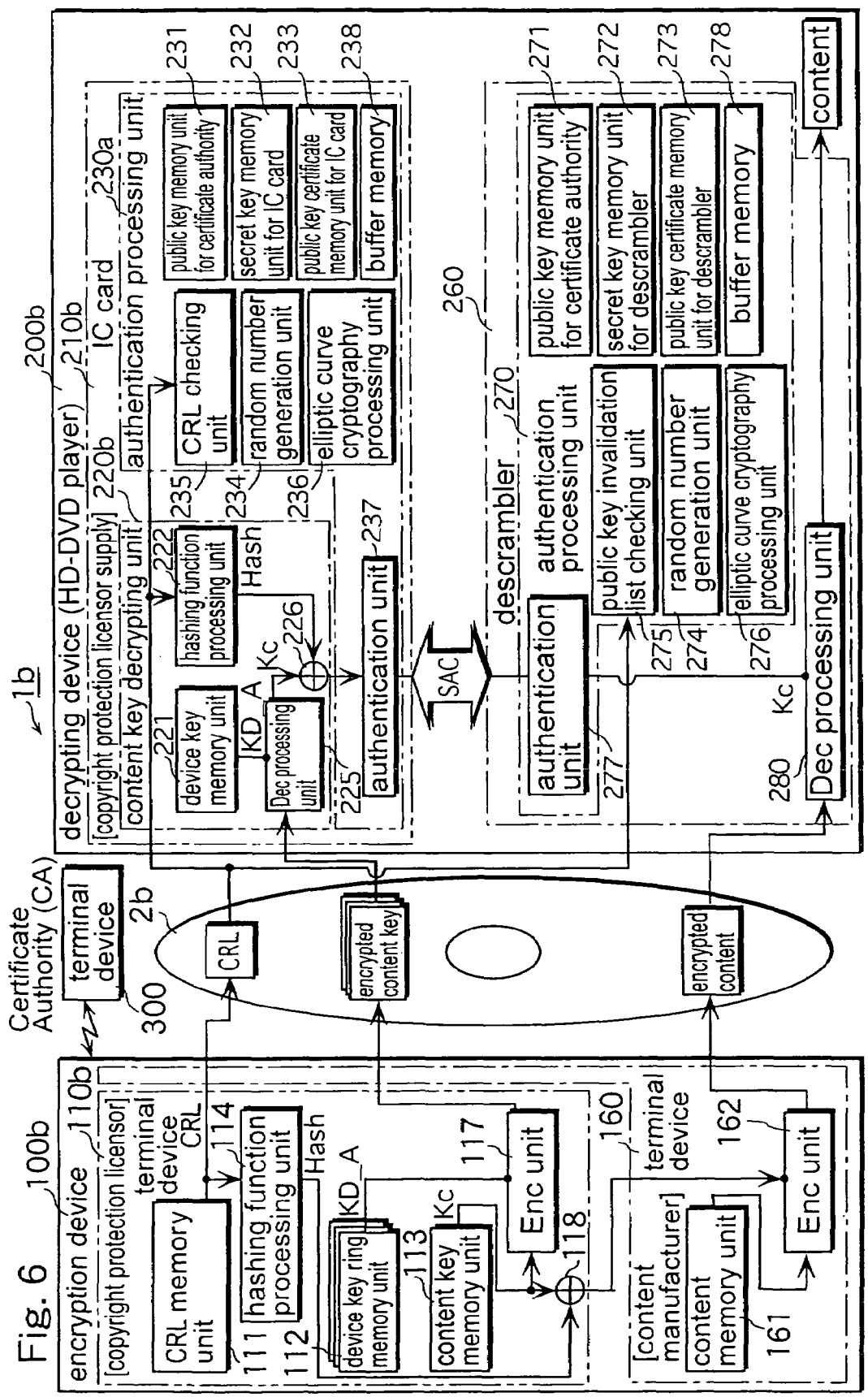
FIG. 6 is a functional block diagram that shows an overall configuration of the recording medium copyright protection system 1b according to the second embodiment.

FIG. 6 is an external view of an arrangement of the copyright protection system 1b for recording medium according to the second embodiment. Now that the components of the recording medium copyright protection system 1b are identified using the same numbers as those in the recording medium copyright protection system 1a of the first embodiment, the explanation is to be omitted except for parts of the recording medium copyright protection system 1b that are different from the recording medium copyright protection system 19.

In the terminal device 110a in the encryption device 100a according to the first embodiment, the Ex-OR unit 115 carries out the exclusive OR between the hashing value Hash of the CRL outputted from the hashing function processing unit 114 and the each device key. The Enc unit 116 encrypts a content key Kc with the exclusive OR value and generates the encrypted content key ring. On the other hand, the terminal device 110b in the encryption device 100b according to the second embodiment, the Enc unit 117 encrypts the content key Kc only with each device key memorized in the device key ring memory unit 112 and generates an encrypted content key ring encrypted only with each device key.

The terminal device 110a in the encryption device 100a according to the first embodiment passes the content key Kc, without any change, to the terminal device 160. So, the terminal device 160 encrypts a content with the content key Kc and generates the encrypted content. On the other hand, the terminal device 110b in the encryption device 100b according to the second embodiment carries out the exclusive OR between the hashing value Hash of the CRL outputted from the hashing processing unit 114 and the content key Kc in the Ex-OR unit 118 and passes it to the terminal device 160. As a result, the terminal device 160 receives the exclusive OR value, encrypts the content with the exclusive OR value, and generates the encrypted content in the Enc unit 162.

Accordingly, there are no hashing values Hash associated with each encrypted content key bound to the DVD2b but the encrypted content is associated with the hashing value Hash. This is a reverse case with the DVD 2a.

The content key decrypting unit 220a in the decrypting device 200a according to the first embodiment calculates the exclusive OR between the self device key KD_A memorized in the device key memory unit 221 in the Ex-OR unit 223 and the hashing value Hash of the CRL. The Dec processing unit 224 decrypts the encrypted content, on which the hashing value Hash is associated, with the exclusive OR value and obtains the content key Kc.

On the other hand, the content key decrypting unit 220b in the decrypting device 200b according to the second embodiment decrypts the encrypted content key only using the self device key memorized in the device key memory unit 221 in the Dec processing unit 225 because the hashing value Hash isn't associated with the encrypted content key bound to the DVD2b and obtains the content key Kc. Since the encrypted content bound to the DVD2b is associated with the hashing value Hash, the Ex-OR unit 226 carries out the exclusive OR between the content key Kc obtained from the Dec processing unit 225 and the hashing value Hash of the CRL calculated in the hashing function processing unit 222 and passes the obtained exclusive OR value to the authentication unit 237 in the authentication processing unit 230a.

The exclusive OR value between the content key Kc and the hashing value Hash is passed from the authentication unit 237 to the Dec processing unit 280 via the SAC and the authentication unit 277 in the descramble 260. The Dec processing unit 280 obtains a content by decrypting the encrypted content associated with the hashing value Hash which is recorded on the DVD2b with the exclusive OR between the content key and the hashing value Hash.

Accordingly, in the recording medium copyright protection system 1b according to the second embodiment, it is necessary to pass the CRL bound to the DVD 2a to obtain a key for decrypting the content in return, as is the same case with the first embodiment. As a result, it is possible to intensify the copyright protection by eliminating the decrypting device 200b which conducts an illegal operation such as a replacement of the CRL.

The Third Embodiment

Figure 7:
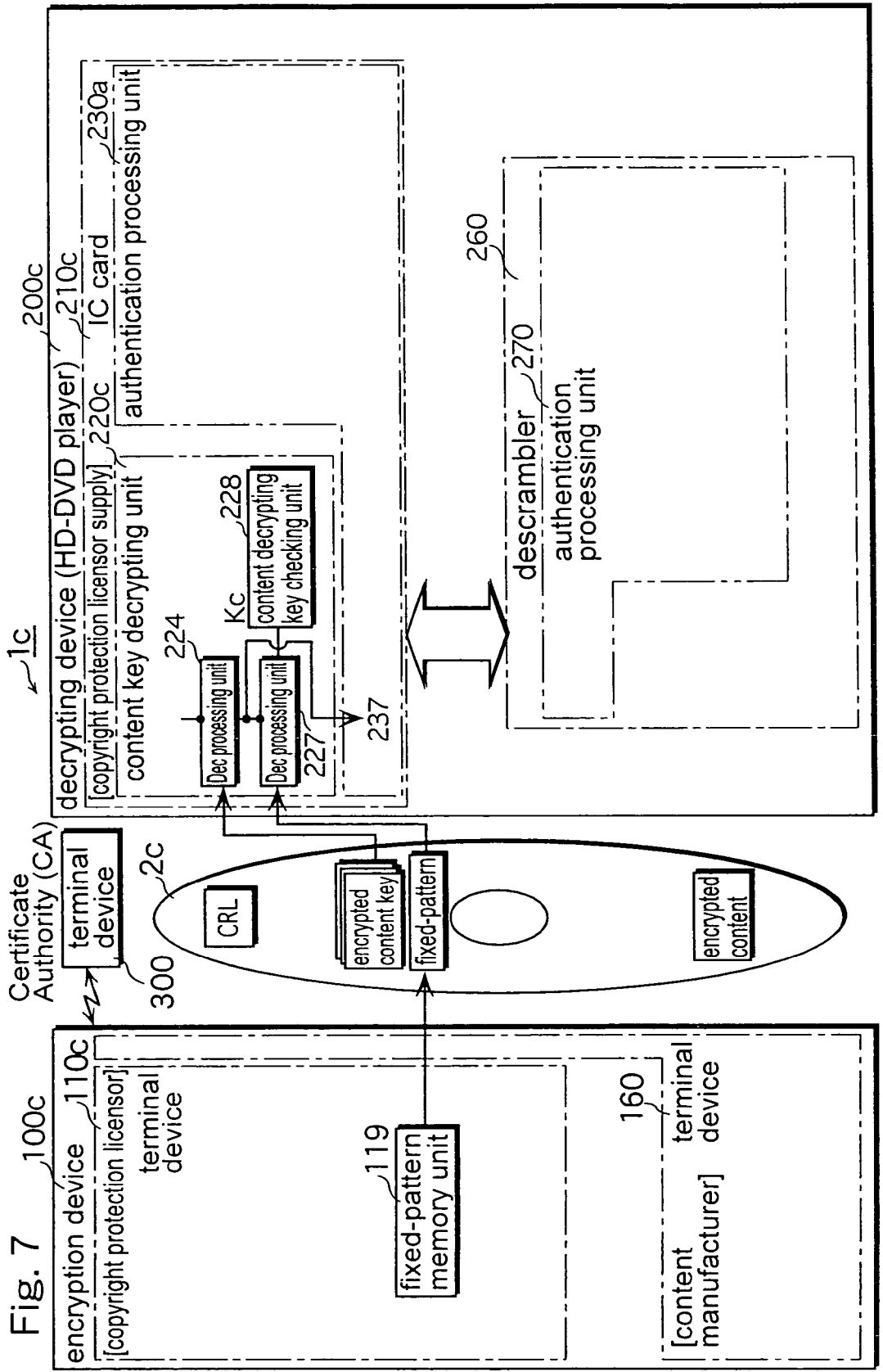
FIG. 7 is a functional block diagram that shows an overall configuration of the recording medium copyright protection system 1c according to the third embodiment.

FIG. 7 is a functional block diagram that shows an overall configuration of the recording medium copyright protection system 1c according to the third embodiment. In this figure, functional parts corresponding to the recording medium copyright protection system 1a according to the first embodiment are not shown, and only the parts specific to the recording medium copyright protection system 1c are shown.

The IC card 210a in the decrypting device 200c according to the first embodiment simply passes the obtained content key Kc to the descrambler 260b. In this way, it is impossible for the IC card 210a itself to know whether or not the obtained key is a qualified key that can normally decrypt the encrypted content. Accordingly, it is desirable to pre-check that the content key Kc has the right value or not before passing the obtained content key Kc to the descrambler 260.

Accordingly, the copyright protection system for a recording medium 1c according to the third embodiment is a system having a key checking function. The terminal device 110c, used by the copyright protection licensor of the encryption device 100c, has a fixed-pattern memory unit 119 besides the componentry of the terminal device 110a. The fixed-pattern memory unit 119 memorizes a predetermined fixed-pattern plaintext (i.e., fixed-pattern plaintext indicated in hex "0123456789ABCDEF"), which is encrypted with the content key Kc in advance. This fixed-pattern memorized in the fixed-pattern memory unit 119 is bound to the DVD2c via the terminal device 160.

The content key decrypting unit 220c set in the IC card 210c in the decrypting device 200c includes a Dec processing unit 227 and a content decrypting key checking unit 228 besides the componentry of the content key decrypting unit 220a. The Dec processing unit 227 decrypts the encrypted data of the fixed-pattern plaintext bound to the DVD 2a with the content key Kc decrypted by the Dec processing unit 224. The content decrypting key checking unit 228 pre-holds the above-mentioned fixed-pattern plaintext '0123456789ABCDEF' and checks whether or not the decrypting key Kc has a right value by checking whether or not the pre-hold fixed-pattern plaintext and the fixed-pattern plaintext decrypted by the Dec processing unit 227 are the same value.

In accordance with the recording medium copyright protection system 1c, it is possible to check, in advance, whether or not the content key Kc has the right value within the IC card 210c. And it is avoidable to execute the decrypting processing with a wrong content key Kc in the descrambler 260.

In the recording medium copyright protection system 1c according to the third embodiment, although the key checking function is applied to the recording medium copyright protection system 1a according to the first embodiment, the key checking function may also be applicable to the recording medium copyright protection system 1b according to the second embodiment.

In such a case, since the content is encrypted with the exclusive OR between the content key Kc and the hashing value Hash of the CRL, the fixed-pattern memory unit 119 memorizes an encrypted fixed-pattern plaintext '0123456789ABCDEF' using the exclusive OR between the content key Kc and the hashing value Hash as a fixed-pattern in advance, and records it on the DVD2c.

The Dec processing unit 227 in the content key decrypting unit 220c outputs the Dec processing unit 224, that is, outputs the Ex-OR unit 226 (refer to FIG. 6) in place of the content key KC, that is, decrypts the encrypted data of the fixed-pattern plaintext bound to DVD 2a with the exclusive OR between the content key Kc and the hashing value Hash. The content decrypting key checking unit 228 is able to check whether or not the key for decrypting the decrypted content is a qualified key, in other words, whether or not the exclusive OR between the content key Kc and the hashing value Hash is a right value by checking whether or not the pre-holding fixed-pattern plaintext '0123456789ABCDEF' and the fixed-pattern plaintext decrypted in the Dec 227 are the same value.

The Fourth Embodiment

Figure 8:
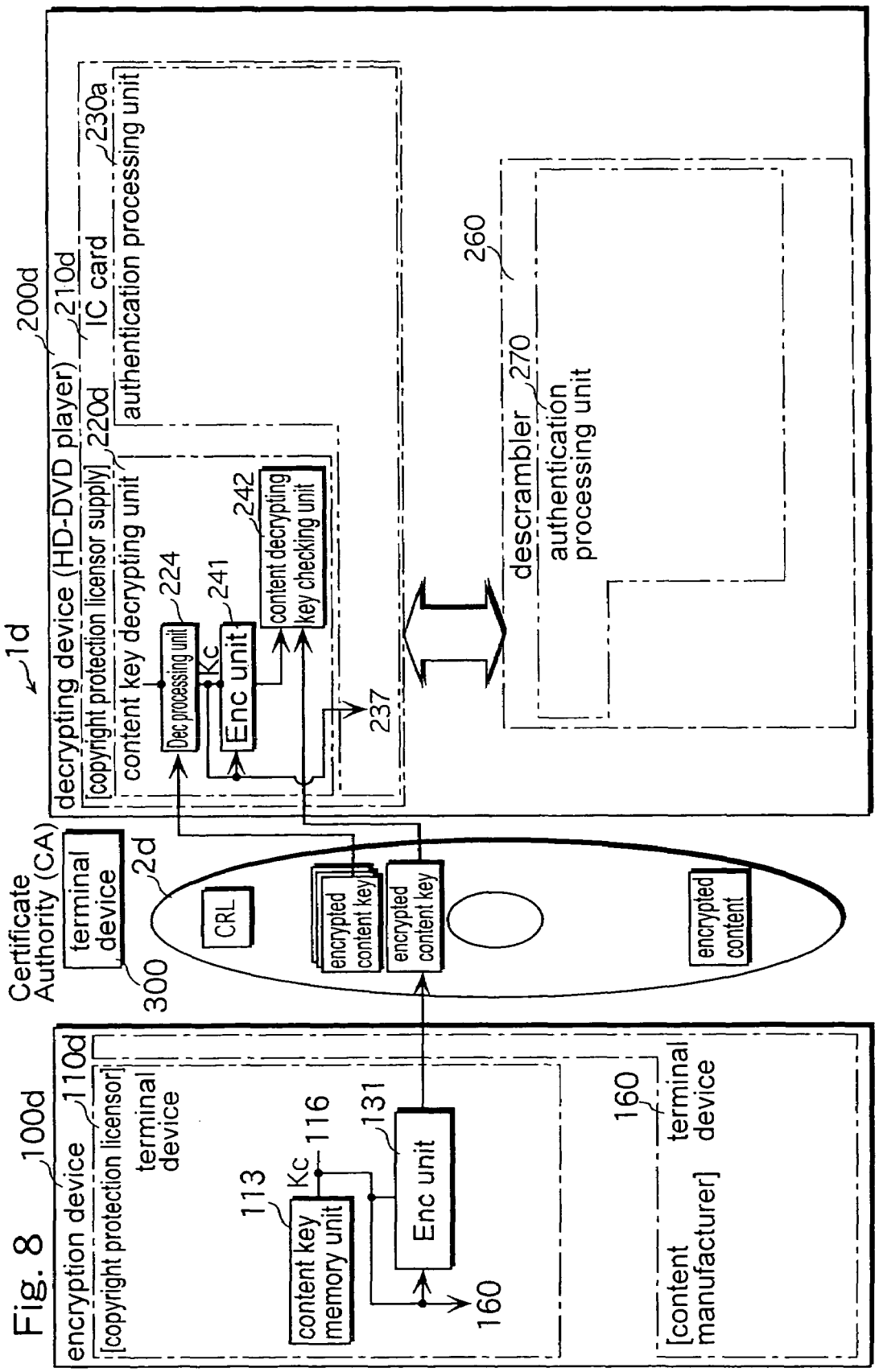
FIG. 8 is a functional block diagram that shows an overall configuration of the recording medium copyright protection system 1d according to the forth embodiment.

FIG. 8 is a functional block diagram that shows an overall configuration of the recording medium copyright protection system 1d according to the forth embodiment. In this figure also, the functional parts corresponding to the recording medium copyright protection system 1a according to the first embodiment are not shown and only the parts specific to the recording medium copyright protection system 1d are shown.

The recording medium copyright protection system 1d according to the forth embodiment is a system that has a key checking function the same as the recording medium copyright protection system 1c. The terminal device 110d in the encryption device 100d includes an Enc unit 131 besides the componentry of the terminal device 110a. The Enc unit 131 generates a content key reference data encrypted with the content key Kc read out from the content key memory unit 113. The content key reference data is bound to the DVD2d.

On the other hand, the content key decrypting unit 220*d* set in the IC card 210*d* in the decrypting device 200*d* includes an Enc unit 241 and a content key checking unit 242 besides componentry of the content key decrypting unit 220*a*. The Enc unit 241, as is the same construction with the Enc unit 131 in the terminal device 110*d*, encrypts the content key decrypted in the Dec processing unit 224 with the content key Kc and generates the content key reference data. The content key checking unit 242 matches up the content key reference data generated in the Enc unit 241 with the content key reference data bound to the DVD2*d* and checks if both data have the same value by checking whether or not the content key Kc decrypted by the Dec processing unit 224 is the qualified key, that is, whether or not the key can be used for decrypting the encrypted content.

As stated above, in accordance with the recording medium copyright protection system 1*d*, it is possible to check whether or not the content key Kc has the right value within the IC card 210*d* in advance as same with the recording medium copyright protection system 1*c*. And it is avoidable to execute the decrypting processing with a wrong content key Kc in the descrambler 260.

In the recording medium copyright protection system 1*d* according to the forth embodiment, although the key checking function is applied to the recording medium copyright protection system 1*a* according to the first embodiment, the key checking function may also be applicable to the recording medium copyright protection system 1*b* according to the second embodiment.

In such a case, since the content is encrypted using the exclusive OR between the content key Kc and the hashing value Hash of the CRL, the Enc unit 131 outputs the content key memory unit 113, that is, outputs the Ex-OR unit 118 in place of the content key KC, that is, decrypts the encrypted data of the fixed-pattern plaintext bound to DVD 2*a* using the exclusive OR between the content key Kc and the hashing value Hash and records it as a content key reference data on the DVD2*c*.

On the other hand, the Enc unit 241 in the content key decrypting unit 220*d* outputs the Dec processing unit 224, that is, outputs the Ex-OR unit 226 (refer to FIG. 6) in place of the content key KC, that is, encrypts the exclusive OR value between the content key Kc and the hashing value Hash using the exclusive OR value. The content key checking unit 242 checks whether or not the key generated in the Ex-OR unit 226 is the qualified key for decrypting the encrypted content by comparing the content key reference data generated in the Enc unit 241 and the content key reference data bound to the DVD2*d*.

The Fifth Embodiment

Figure 9:
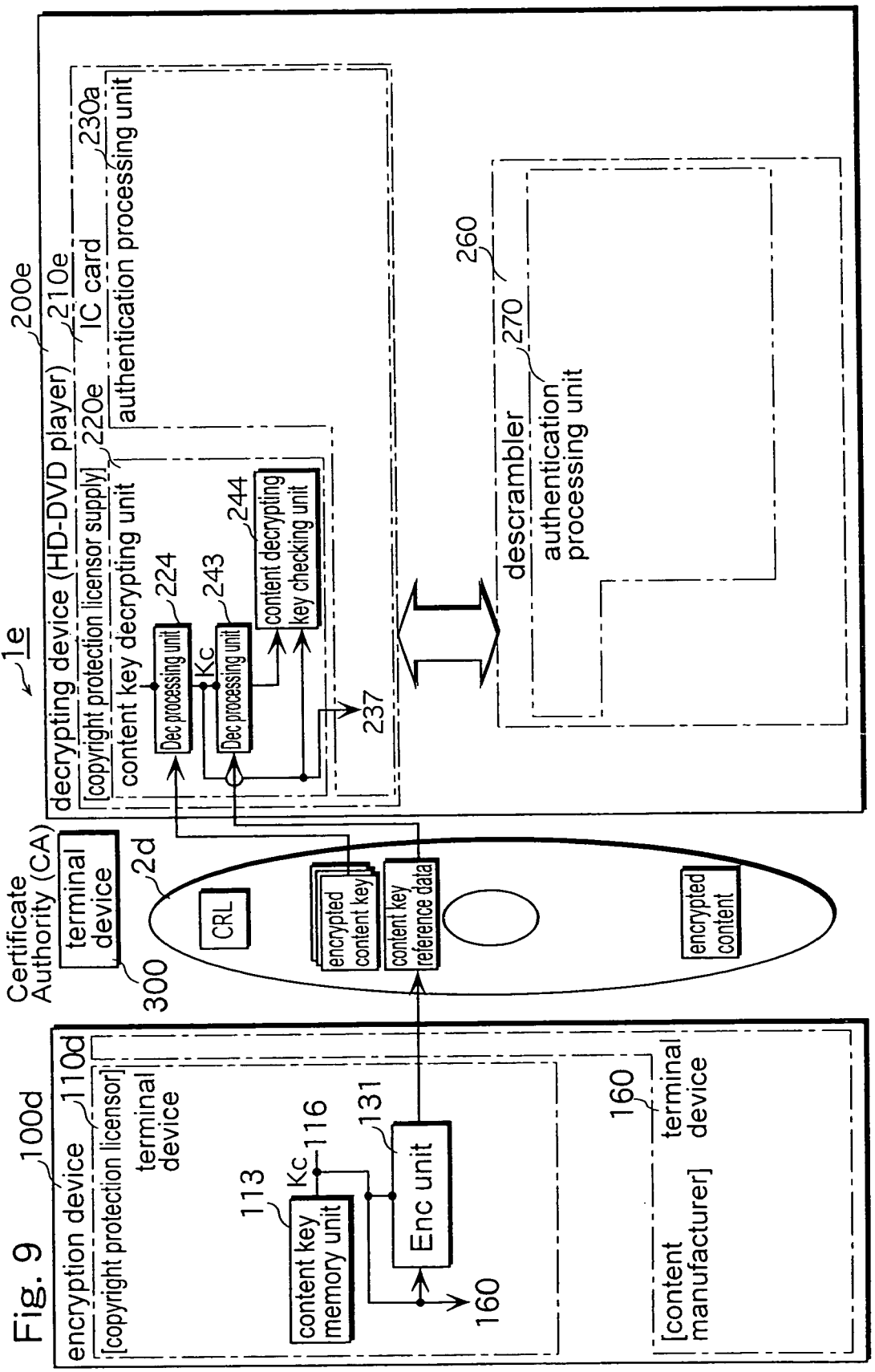
FIG. 9 is a functional block diagram that shows an overall configuration of the recording medium copyright protection system 1e according to the fifth embodiment.

FIG. 9 is a functional block diagram that shows an overall configuration of the recording medium copyright protection system 1*e* according to the fifth embodiment. In this figure also, the functional parts corresponding to the recording medium copyright protection system 1*a* according to the first embodiment are not shown, and only the parts specific to the recording medium copyright protection system 1*e* are shown.

The recording medium copyright protection system 1*e* according to the fifth embodiment is a system that has a key checking function that is the same as the recording medium copyright protection systems 1*c* and 1*d*, and its component are the same as the encryption device 100*d* according to the forth embodiment. The content key reference data generated from the Enc unit 131 is bound to the DVD2*d*.

The content key decrypting unit 220*e* set in the IC card 210*e* of the decrypting device 200*e* which includes a Dec processing unit 243 and a content key checking unit 244 besides the componentry of the content key decrypting unit 220*a*. The Dec processing unit 243 is encrypted in the Enc unit 131 as stated above and decrypts the content key reference data bound to DVD2*d* with the content key Kc decrypted in the Dec processing unit 224. The content key checking unit 244 which matches up the content key Kc decrypted in the Dec processing unit 224 with the content key Kc decrypted in the Dec processing unit 243, and checks if both keys have the same value by checking if the content key Kc decrypted by the Dec processing unit 224 is the qualified key or not, that is, whether or not the key can be used for decrypting the encrypted content.

As stated above, in accordance with the recording medium copyright protection system 1*e*, it is possible to check whether or not the content key Kc has the right value within the IC card 210*d* in advance as same with the recording medium copyright protection systems 1*c* and 1*d*. And it is avoidable to execute useless decrypting processing using a wrong content key Kc in the descrambler 260.

In the recording medium copyright protection system 1*e* according to the fifth embodiment, although the key checking function is applied to the recording medium copyright protection system 1*a* according to the first embodiment, the key checking function may also be applicable to the recording medium copyright protection system 1*b* according to the second embodiment.

In such a case, since the content is encrypted using the exclusive OR between the content key Kc and the hashing value Hash of the CRL, as is the same with the forth embodiment, the Enc unit 131 outputs the content key memory unit 113, that is, outputs the Ex-OR unit 118 in place of the content key KC, that is, decrypts the encrypted data of the fixed-pattern plaintext bound to DVD 2*a* using the exclusive OR of the content key Kc and the hashing value Hash and records it as a content key reference data to the DVD2*c*.

On the other hand, the Dec processing unit 243 in the content key decrypting unit 220*e* outputs the content key decrypting data read from the DVD2*c* to the Dec processing unit 224, that is, outputs the Ex-OR unit 226 (refer to FIG. 6) in place of the content key KC, that is, decrypts using the exclusive OR value between the content key Kc and the hashing value Hash. The content key checking unit 244 checks whether or not the key generated in the Ex-OR unit 226 is the qualified key that can decrypt an encrypted key, that is, compares whether or not the exclusive OR value between the content key Kc and the hashing value Hash with the key decrypted by the Dec processing unit 243 match.

The Sixth Embodiment

Figure 10:
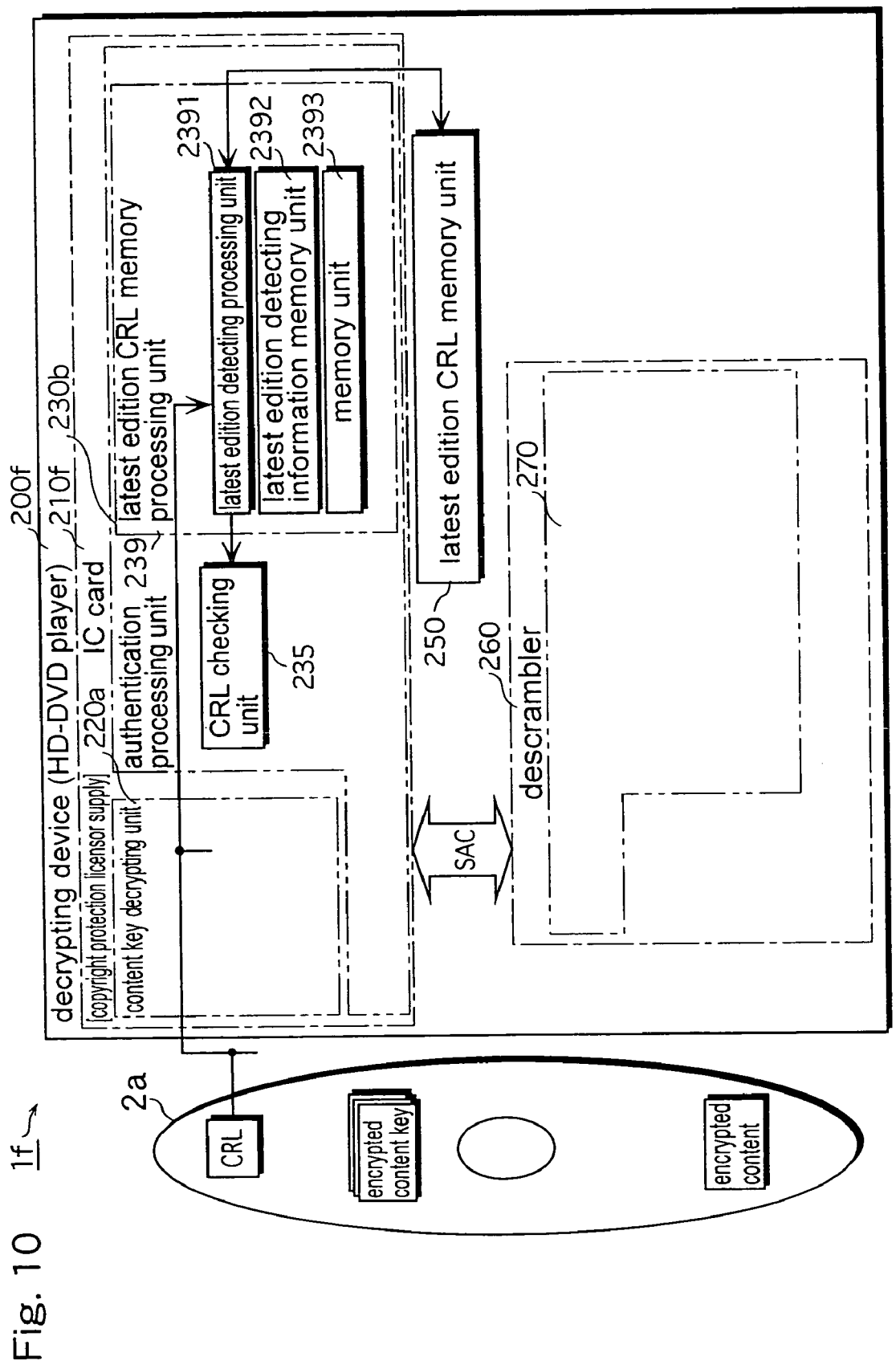
FIG. 10 is a functional block diagram that shows an overall configuration of the recording medium copyright protection system according to the sixth embodiment.

FIG. 10 is a functional block diagram that shows an overall configuration of the recording medium copyright protection system according to the sixth embodiment. In the recording medium copyright protection systems 1*a* to 1*e*, as stated above, the CRL checking unit 235 checks the CRL bound to the DVD and judges whether or not the communication partner (descrambler 260) is revoked. With this check, however, it is impossible to revoke the descrambler 260 when the public key certificate of the communication partner (descrambler 260) is revoked after updating the CRL if the time of the production of the DVD is well before, that is, the CRL bound to the DVD is old. For this reason, it is necessary to make judgment of whether or not the communication partner (descrambler 260) is revoked using a CRL that is the latest possible.

Therefore, the recording medium copyright protection system if according to the sixth embodiment has a latest edition CRL memory processing unit 239 besides the componentry of the authentication processing unit 230a in the authentication processing unit 230b in the IC card 210f in the decrypting device 200f.

The latest edition CRL memory processing unit 239 is a processing unit operable to memorize a latest edition CRL, which is extracted from the CRL received hitherto, and hold it in the decrypting device 200f. The processing unit includes a latest edition detecting processing unit 2391, a latest edition detecting information memory unit 2392 and a memory unit 2393.

The latest edition detecting processing unit 2391 conducts a verification processing pf whether or not the CRL is the latest with every receiving of the CRL bound to the DVD 2a.

The latest edition detecting information memory unit 2392 memorizes the latest edition detecting information of the CRL (i.e. file size of the list) held by the decrypting device 200f.

The memory unit 2393 memorizes the hashing value Hash (i.e., 128 bit) of the CRL held by the decrypting device 200f. The reason for that is, when a large size of the CRL is memorized and is held in the IC card 210f inside, the cost effectiveness for the IC card 210f will become high. That is, in this embodiment, a latest edition CRL memory unit 250 is installed outside of the IC card 210f (and inside of the decrypting device 200f) and memorizes a latest edition CRL so as to memorize/hold only the hashing value Hash of the list in the memory unit 2393 of the IC card 210f inside. When the CRL checking unit 235 checks whether or not the communication partner is a revoked device, the latest edition CRL is read out to the IC card 210f and checks it with the hashing value Hash.

Figure 11A:
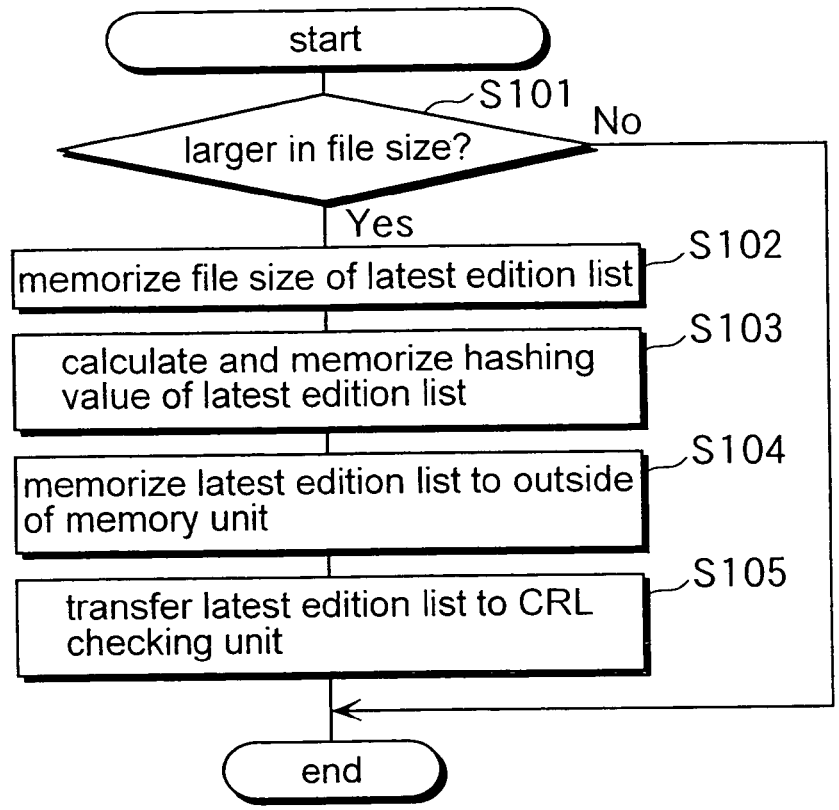
FIG. 11A is a flow chart that shows the verification processing conducted in the latest edition detecting processing unit 2391 in FIG. 10.

More specifically, when a new CRL bound to the DVD 2a is received, the latest edition detecting processing unit 2391 executes the verification processing whether or not the CRL is a latest edition as a mid-processing of holding (or not holding) a CRL as shown in the flow chart of FIG. 11A.

That is, the latest edition detecting processing unit 2391 compares a file size, which is recoded in a header of the CRL bound to the DVD 2a, with a size memorized in the latest edition detecting information memory unit 2392 (S101). This comparison is made on the basis of the characteristic of the CRL that the revoked computers increase monotonously and the file size becomes large as the time goes by.

As a result, when the file size of the CRL bound to the DVD 2a is larger ("YES" in S101) than the previous one, that is, when the CRL read out from the DVD 2a at the present moment is the latest, the file size of the latest edition is to be updated by storing (overwriting) the list in the latest edition detecting information memory unit 2392 (S102). The latest edition detecting processing unit 2391 calculates a hashing value Hash of a latest edition list, stores the hashing value Hash in the memory unit 2393 (S103), stores the latest edition list in a latest edition CRL memory unit 250 (S104), and transfers the latest edition list to the CRL checking unit 235 (S105). Thus the confirmation verification processing ends.

Figure 11B:
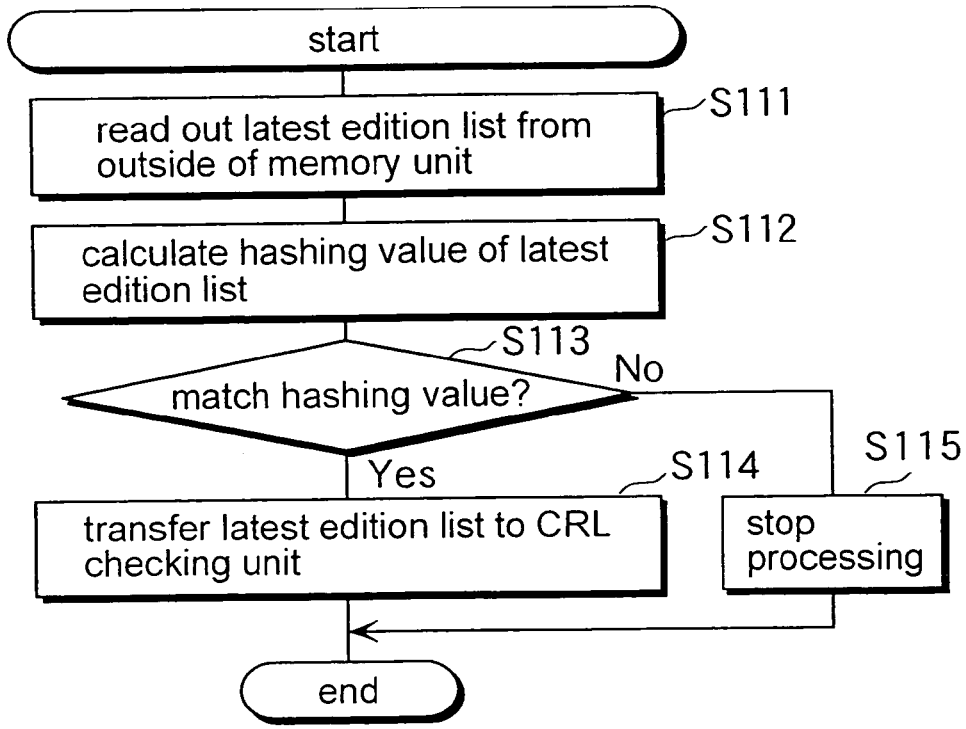
FIG. 11B is a flow chart that shows the latest edition list reading-out processing.

On the other hand, when the file size of the CRL bound to the DVD 2a is not larger ("NO" in S101) than the previous one, that is, the CRL which is read out from the DVD 2a at the present moment is not the latest, then the latest edition detecting processing unit 2391 ends the confirmation verification processing immediately. When it is necessary to have a latest CRL, a processing of reading out the latest CRL is executed, as shown in FIG. 11B.

In that reading-out processing, the latest edition detecting processing unit 2391 reads out the latest edition list from the outside of the memory unit, that is, the latest edition CRL memory unit 250 (S111), calculates the hashing value Hash of the latest edition list (S112), and verifies whether or not the calculated hashing value Hash matches the hashing value Hash memorized in the memory unit 2393 (S113). This verification is conducted for detecting whether or not a replacement is carried out. When it has been not carried out, the two hashing values Hash match.

When the hashing value Hash matches ('Yes' in S113), the latest edition detecting processing unit 2391 transfers the latest edition list read out from the CRL latest edition list memory unit 250 to the CRL checking unit 235 (S114) and ends the latest edition list reading-out processing. On the other hand, when the two hashing values Hash don't match ('NO' in S113), the latest edition detecting processing unit 2391 stops the processing (S115) and ends the reading-out processing. When the case that the latest CRL is not read out because of the mismatch of the two hashing value Hash, the latest edition detecting processing unit 2391 assumes that some unauthorized use was conducted, and terminates all the processing (rejects an authentication of the partner computer) after the processing of using the CRL.

As a result, in accordance with the copyright protection system for the recording medium 1f of the sixth embodiment, the latest list within the read out CRL from the DVD 2a is held in the is latest edition CRL memory unit 250 and be used. Thus, it is avoidable to authenticate a partner device using the old CRL.

Additionally, the file size is used in a way for confirming the latest edition list according to the sixth embodiment, however, a numbers of the certificate (the serial entry number) registered in the CRL may also be used for this confirmation processing.

An explanation for an example where the decrypting devices 200a to 200f for the recording medium according to the embodiment of the copyright protection system for the present invention are applied to the HD-DVD player is made with reference to figures.

Reference is now made to FIG. 12 which illustrates an external view of an arrangement of the HD-DVD player which includes the decrypting devices 200a to 200f for the recording medium according to the embodiment of the present invention.

The HD-DVD player 200 is a system that plays back a content (i.e., movies) recorded on the DVD 2a to 2d using the IC card 210a to 210f. It comprises of a card inserter 2100 that the IC card 210a to 210f are to be inserted, a DVD-ROM drive 2200 that plays back the DVD 2a to 2d, and the descrambler 260 that is implemented inside of the HD-DVD player 200.

In addition, the IC card 210a, to 210f is a plastic card, that the IC tip, including CPU, is embedded and a card which is able to verify whether or not an access is the qualified access when reading out the data. As a result of this, it is very hard for an outsider to conduct an unauthorized use or to tamper, thus, the high security is guaranteed.

For applying the encryption device according to the present invention to an image-playback system, the digital production recorded on the DVD 2a to 2d can be protected from illegal copying. The development of the present invention in the multimedia related products circulation market is to be prospected.

The Seventh Embodiment

Figure 13:
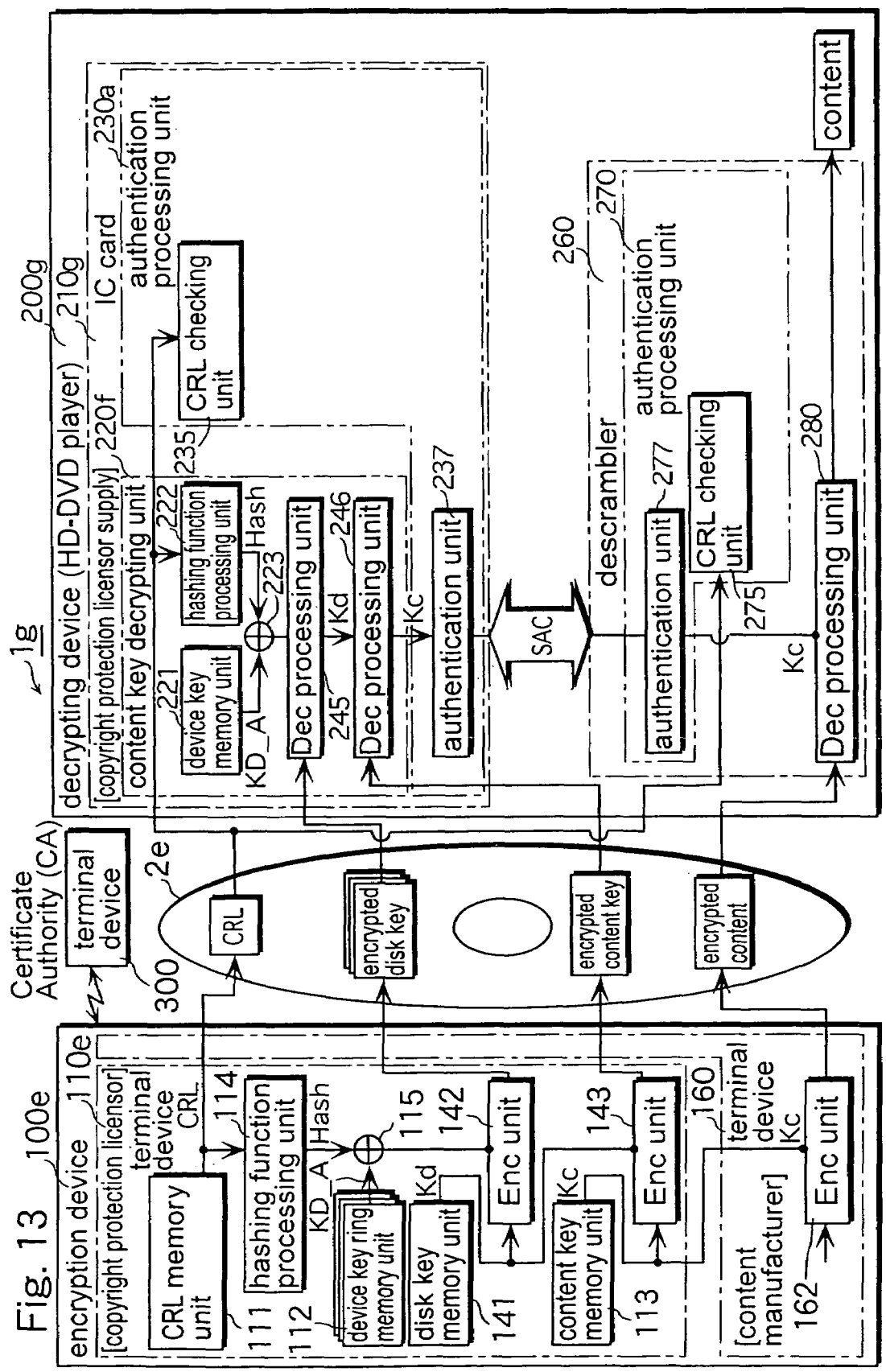
FIG. 13 is a functional block diagram that shows an overall configuration of the recording medium copyright protection system 1g according to the seventh embodiment.

Reference is now made to FIG. 13 which illustrates a functional block diagram that shows an overall configuration of the recording medium copyright protection system 1g according to the seventh embodiment. Now that the functional elements of the recording medium copyright protection system 1g are put the same numbers corresponding to those of the recording medium copyright protection system 1a of the first embodiment. The explanation is to be omitted except the different parts of the recording medium copyright protection system 1a.

The encryption device 100a according to the first embodiment stores two keys, the device key ring KD_A and the content key Kc to the device key ring memory unit 112 and the content key memory unit 113, respectively. Then, the content key Kc is encrypted with the device key ring KD_A with which the hashing value Hash of the CRL is associated and generates the encrypted content key. That is, the encryption device is double layered with the device key KD_A and the content key Kc. This construction usually makes the encryption intensify against an attack.

However, there are licensors who want to further intensify the encryption. Therefore, the terminal device 110e in the encryption device 100e according to the seventh embodiment further intensifies the encryption by adopting an triple layered construction, with the device key KD_A, the content key Kc, as mentioned-above, and a disk key Kd.

In other words, the terminal device 110e in the encryption device 100e includes a hashing function processing unit 114 that memorizes the disk key Kd, and an Enc unit 142, 143 besides the CRL memory unit 111, the device key ring memory unit 112, content key memory unit 113, the hashing function processing unit 114 and the Ex-OR unit 115. In addition, this disk key Kd is located in the upper layer of the DVD with considering that the DVD records a plurality of content (approx.7).

The Enc unit 142 encrypts the disk key Kd memorized in the disk key memory unit 141 using the exclusive OR between the hashing value Hash and the each device key KD_A and generates an encrypted disk key ring.

The Enc unit 143 encrypts the content key Kc memorized in the content key memory unit 113 using the disk key Kd and generates the encrypted content key.

As a result, the terminal device 160 binds the encrypted content, the CRL, the encrypted disk key ring generated by the Enc unit 142,143 and the encrypted content key, to the DVD2e.

In response to above, the content key decrypting unit 220f in the IC card 210g, which is in the decrypting device 220f, memorizes only the device key KD_A and decrypts the disk key Kd by decrypting the encrypted disc key ring bound to the DVD2e using the device key KD_A and the hashing value Hash of the CRL. Furthermore, it decrypts the content key Kc by decrypting the encrypted content key bound to DVD2e with the disk key Kd.

In other words, the content key decrypting unit 220f includes Dec processing unit 245 and 246 besides the device key memory unit 221, the hashing function processing unit 222 and the Ex-OR unit 223.

The Dec processing unit 245 decrypts the disk key Kd by decrypting the encrypted disk key ring passed by the descrambler 260 using the hashing value Hash of the device key KD_A and the hashing value Hash of the CRL.

The Dec processing unit 246 decrypts the content key Kc by decrypting the encrypted content key passed from the descrambler 260 using the disk key Kd.

Accordingly, the recording medium copyright protection system 1g according to the seventh embodiment, as same case with the first embodiment, should give the CRL bound to the DVD2e for obtaining the key for decrypting the content in return. This enables not only elimination of the illegal descrambler 260 that conducts a replacement of the CRL, but also intensifies the copyright protection further, because the secret key is triple layered. As a result, the encryption intensity increases against an attack.

Additionally, although the secret key is triple layered in this embodiment, it may be possible for it to be multilayered. In that case, the encryption intensity becomes higher against an attack.

Also, the terminal device 110e may possibly include further a confirmation data outputting unit that outputs the confirmation data, which is to be a criterion for verifying whether or not the decrypted content key is the qualified key in the decrypting device 200k, to the DVD2e. In this confirmation data outputting unit may function as outputting a data obtained by encrypting the predetermined fixed-pattern data using the content key memorized in the content key memory unit 113 as a confirmation data to the DVD2e. Also, in correspond to the terminal device 110e, the content key decrypting unit 220f may include a content decrypting key checking unit 228, a content key checking unit 242 and a content decrypting key checking unit 244 to verify whether or not the decrypted content key is the qualified key.

Figure 14:
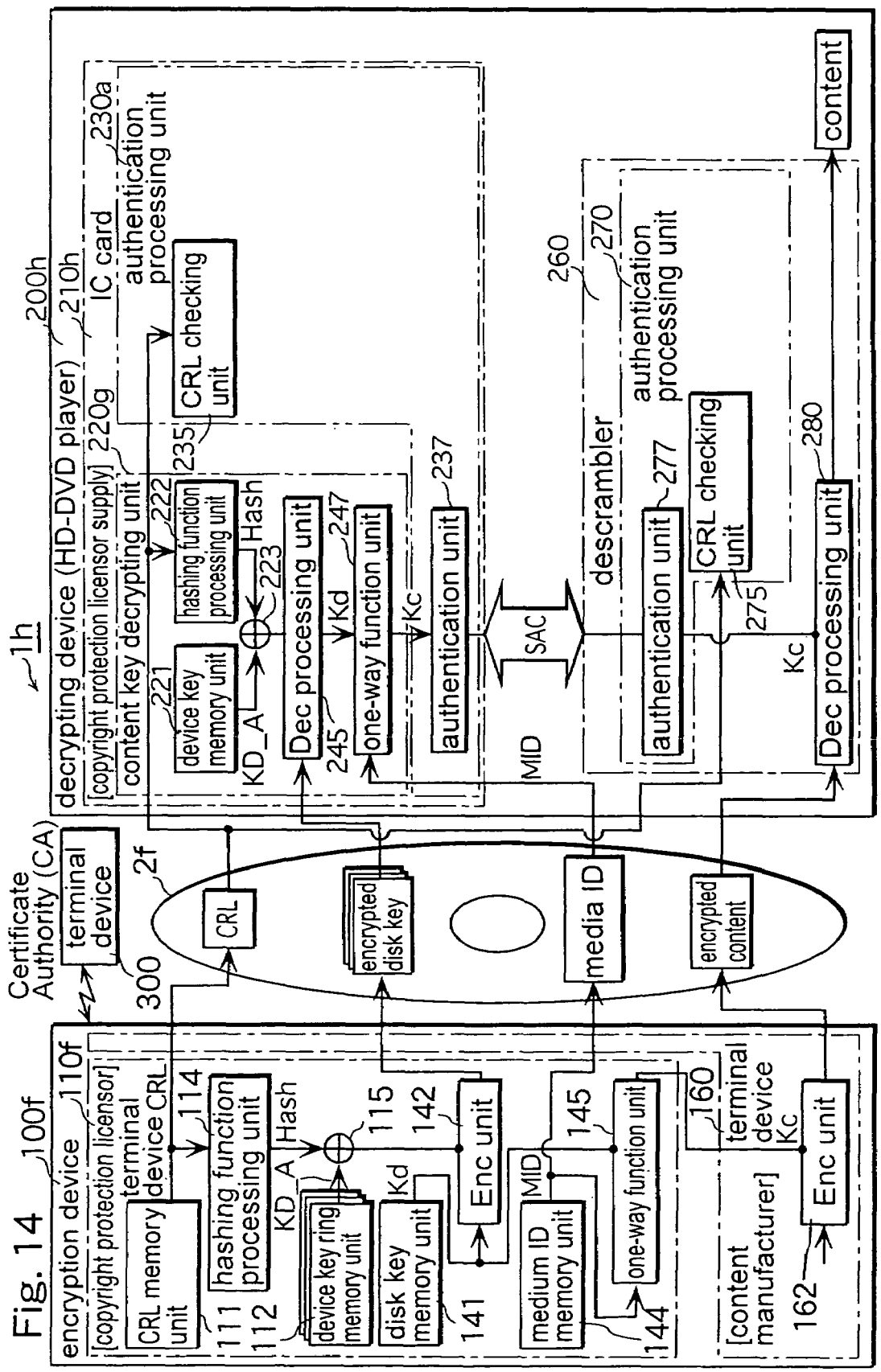
FIG. 14 is a functional block diagram that shows an overall configuration of the recording medium copyright protection system 1h according to the eighth embodiment.

The Eighth Embodiment reference is now made to FIG. 14 which illustrates an external view of an arrangement of a recording medium copyright protection system 1h according to the eighth embodiment. Now that the functional elements of the recording medium copyright protection system 1h are put the same numbers corresponding to those of the recording medium copyright protection system 1g of the seventh embodiment. The explanation is to be omitted except the different part of the recording medium copyright protection system 1g.

The terminal device 110e in the encryption device 100e according to the seventh embodiment encrypts the disk key Kd memorized in the disk key memory unit 141 using the exclusive OR value between the hashing value Hash and the each device key KD_A, and generates the encrypted disk key ring, along with that, encrypts the content key memorized in the content key memory unit 113 with the disk key Kd and generates the encrypted content key. As a result, the terminal device 110e increases the encryption intensity against an attack, however a load for the two decrypting processing becomes high. In the content key decrypting unit 220f also, a load for the two decrypting processing becomes high.

Therefore, the terminal device 110f in the encryption device 100f, according to the recording medium copyright protection system 1h, reduces the load by cutting out a processing of encrypting the content key Kc by using a medium ID memory unit 144 to memorize the medium ID and a MID that specific to every DVD, in place of the content key memory unit 113 and a one-way function unit 145 that generates a content key Kc based on the medium ID, and the MID in place of the Enc unit 143.

In other words, the terminal device 110f in the encryption device 100f further includes the medium ID memory unit 144 and the one-way function unit 145 besides the CRL memory unit 111, the device key ring memory unit 112, the hashing function processing unit 114, the Ex-OR unit 115, the disc key memory unit 141 and the Enc unit 142.

The one-way function unit 145 (i.e.Ex-OR) generates a content key Kc by inputting a medium ID memorized in the medium ID memory unit 144, a MID and a disk key Kd into the one-way function. The load of the processing of generating the content key Kc is much lighter than that of the processing of generating the encrypted content key in the Enc unit 143, shown in FIG. 13.

The terminal device 160 binds an encrypted disk key ring generated by the Enc unit 142, a medium ID outputted by the is medium ID memory unit 144 and a MID, besides the CRL and the encrypted content, to the DVD2f.

On the other hand, the content key decrypting unit 220g in the IC card 210h of the decrypting device 200h memorizes only the device key KD_A, decrypts the disk key Kd by decrypting an encrypted disk key ring bound to the DVD2e and the hashing value Hash of the CRL and generates the content key Kc based on the medium ID, the MID and the disk key Kd which are bound to DVD2e.

In other words, the content key decrypting unit 220g further includes a one-way function unit 247, the same construction with the unit 145, besides the device key memory unit 221, the hashing function processing unit 222, the Ex-OR unit 223 and the Dec processing unit 245.

The one-way function unit 247 generates the content key Kc by processing the medium ID and the MID put into the one-way function unit 247 using the disk key Kd. A load for this content key Kc generating processing is lighter than that of the content key decrypting processing in the Dec processing unit 246 of FIG. 13.

It is easy for the medium ID and the MID to be known because they are bound to the DVD2f, however, the construction of the one-way function unit 145 and 247 is hard to be known, as is the same case with the secret key.

Accordingly, because the recording medium copyright protection system 1h according to the eighth embodiment should pass the CRL bound to the DVD 2a for getting a key for decrypting content in return, same as the first embodiment, this enables to eliminate the descrambler 260 which conducts an unauthorized use, such as a replacement of the CRL, and increase the encryption intensity against an attack. Thus the encryption intensity further increases for the copyright protection and reduces the load for the terminal device 110f and the content key decrypting unit 220g.

In addition, the terminal device 110f may further include a confirmation data outputting unit to output the confirmation data to the DVD2f. The confirmation data is to be a criterion for confirming whether or not a content key decrypted in the decrypting device 200h is the qualified key. The confirmation data outputting unit may also encrypt the predetermined fixed-pattern data using the content key memorized in the content key memory unit 113 and output it as a confirmation data. Also, the confirmation data outputting unit may output a data obtained by encrypting the content key using the content key as a confirmation data, to the DVD2f. In response to the terminal device 110f, the content key decrypting unit 220f may include a content decrypting key checking unit 228, a content key checking unit 242, and a content decrypting key checking unit 244.

The Ninth Embodiment

Figure 15:
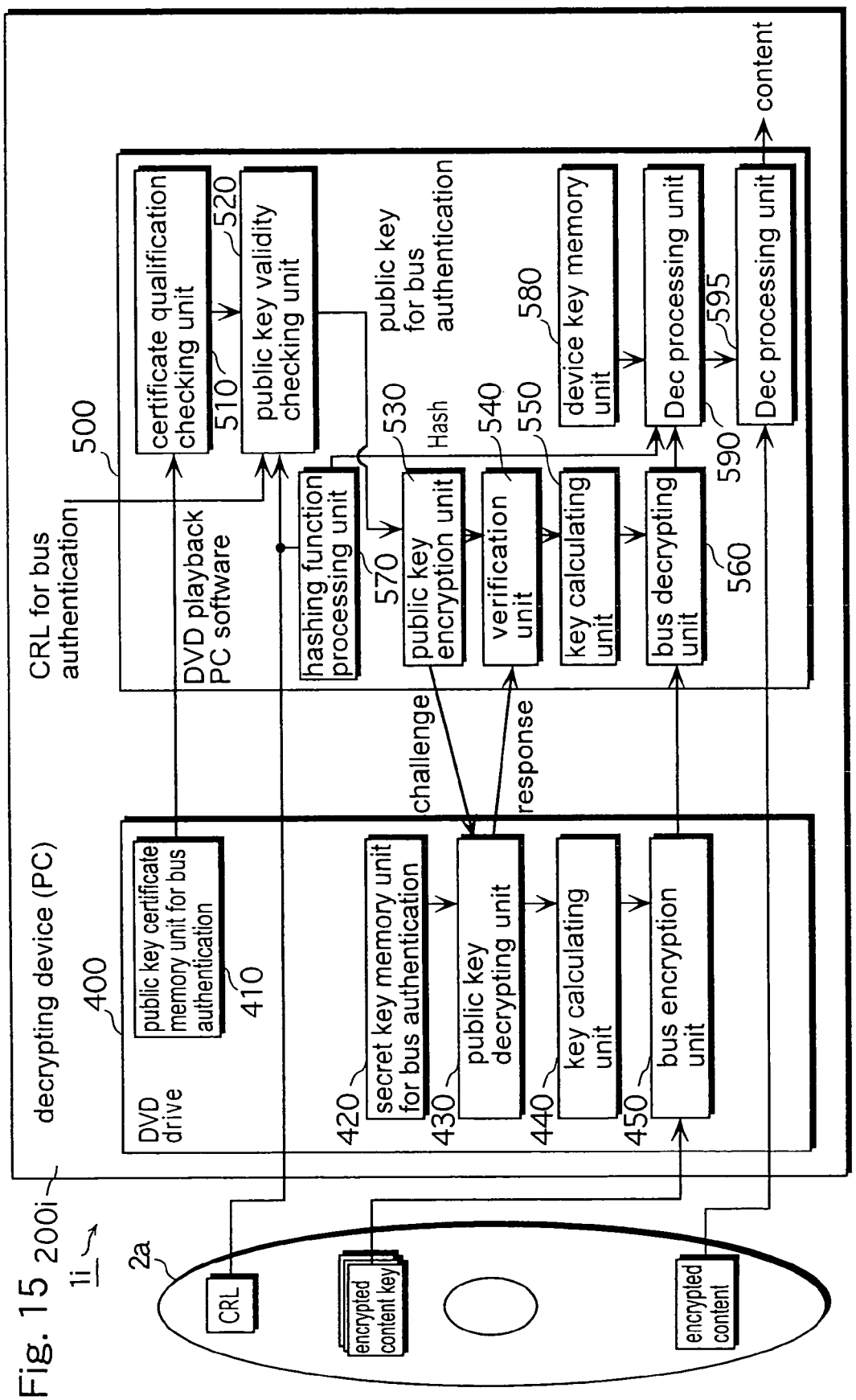
FIG. 15 is a functional block diagram that shows an overall configuration of the recording medium copyright protection system 1i according to the ninth embodiment.
Figure 16:
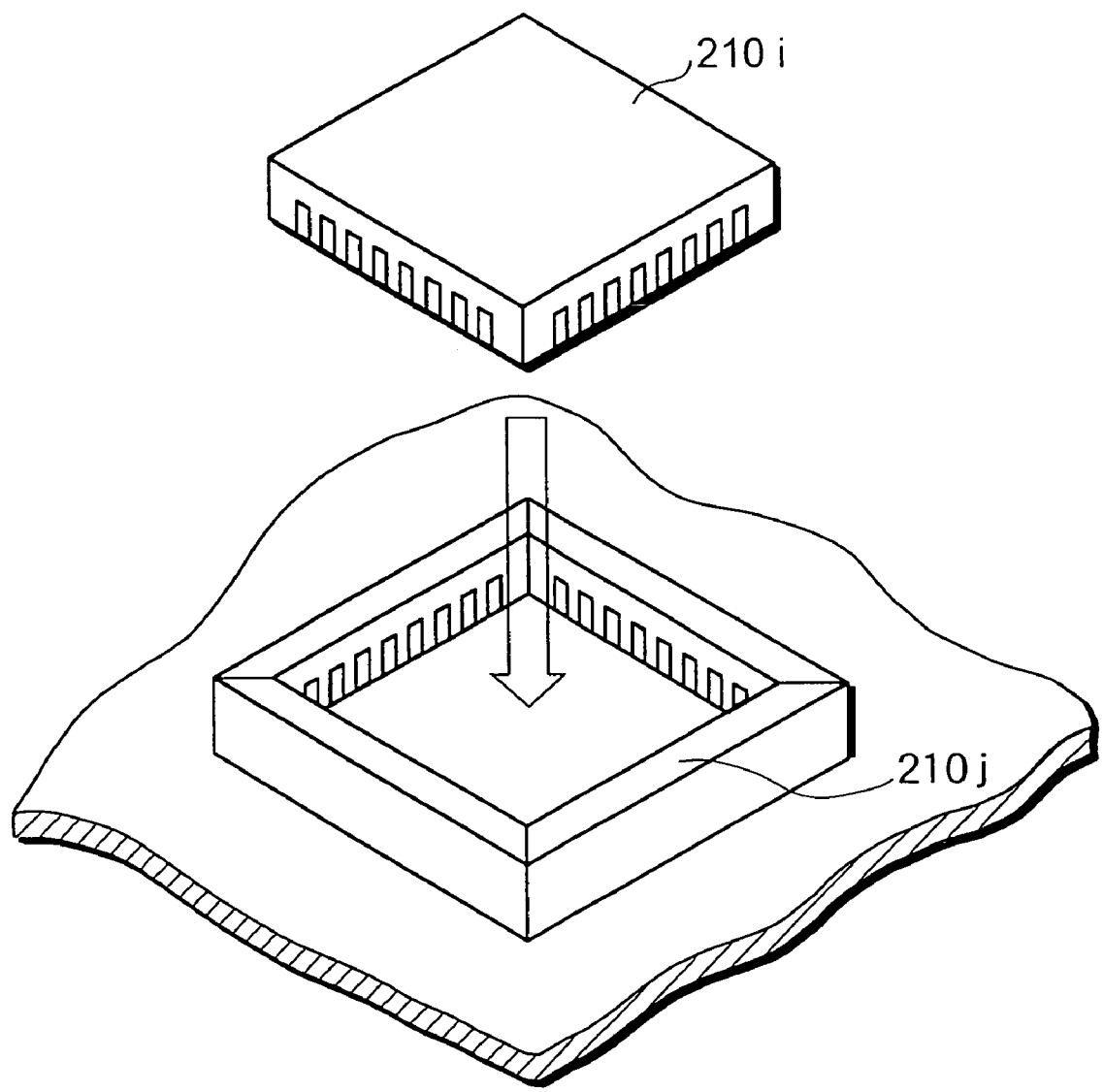
FIG. 16 is a diagram that shows an example of the copyright protection module which includes LSI.

Reference is now made to FIG. 15 which illustrates a functional block diagram that shows an overall configuration of the recording medium copyright protection system 1i according to the ninth embodiment. Now that the functional elements of the recording medium copyright protection system 1i is put the same number corresponding to those of the recording medium copyright protection system 1a of the first embodiment. The explanation is to be omitted except for the different parts of the recording medium copyright protection system 1a.

By the way, it is also necessary for a DVD medium to have a copyright protection, as is the same case with the HD-DVD, because the DVD is very high for its affinity with a personal computer (PC). As a result, the DVD can be read out in a personal computer (PC). When the DVD drive is mounted to the PC, at the same time, the PC installs the playback software in the hard disk so as to view a content using the PC as a decrypting device, as is the same case with the DVD-HD.

The decrypting device 200a includes the IC card 210a and the descrambler 260 according to the first embodiment, however, the decrypting device for PC generally includes the DVD drive and the playback software.

Therefore, the decrypting device 200i comprises of a DVD drive 400, which includes the descrambler 260 and the authentication processing unit 270, and a DVD playback PC software 500 which includes the IC card 210a and the Dec processing unit 280 in the descrambler 260. For further information, the manufacturer for the DVD drive 400 is different from its DVD playback PC software 500.

The DVD drive 400 is the same construction with the authentication processing unit 270. The DVD drive 400 includes a public key certificate memory unit for the bus authentication 410, a secret key memory unit for a bus authentication 420, a public key decrypting unit 430, a key calculating unit 440 and a bus encryption unit 450.

The public key certificate memory unit for the bus authentication 410 in the DVD drive 400 memorizes a public key certificate for the bus authentication, such as an IDE bus and a SCSI bus, in advance, and passes the public key certificate for the bus authentication to the DVD playback PC software 500 when the DVD 2a plays back content.

The secret key memory unit for the bus authentication 420, the public key decrypting unit 430, the key calculating unit 440 and the bus encryption unit 450 generate a session key K and form a SAC between the DVD playback PC software 500.

The DVD playback software 500 includes a certificate qualification checking unit 510, a public key validity checking unit 520, a public key encryption unit 530, a verification unit 540, a key calculating unit 550, a bus decrypting unit 560, a hashing function processing unit 570, a device key memory unit 580, and a Dec processing unit 590, 595. The above each unit is implemented in a software, a CPU in the PC and a memory, etc.

The certificate qualification checking unit 510 checks whether or not the certificate is qualified by decrypting the certificate sent from the public key certificate memory unit for the bus authentication 410 with the public key.

The public key validity checking unit 520, upon receipt of the notice from the certificate qualification checking unit 510 that the certificate is qualified, checks whether or not the DVD drive is revoked with reference to the CRL for the bus authentication received via the DVD drive 400 and the latest CRL for the bus authentication which read out from the latest edition CRL memory unit 250.

When the public key encryption unit 530, the verification unit 540, the key calculating unit 550, and the bus decrypting unit 560 receive the notice from the public key validity checking unit 520 that the DVD drive 400 is not revoked, that is, the DVD drive 400 is qualified, a session key K' is generated, and the SAC is formed between the DVD drive 400.

The public key encryption unit 530 calculates a hashing value Hash of the CRL.

The device key memory unit 580 memorizes the device key KD_A in advance.

The Dec processing unit 590 generates a content key Kc based on the encrypted content key outputted from the bus decrypting unit 560, the hashing value Hash outputted from the hashing function processing unit 570 and the device key kD_A.

The Dec processing unit 590 generates a content by decrypting the encrypted content bound to the DVD 2a using the content key Kc.

Here is an explanation for the authentication processing executed between the DVD drive 400 and the DVD playback PC software 500.

The public key encryption unit 530 generates a random number cha upon receipt of the notice that the DVD drive is qualified, encrypts the generated random number cha using the partner public key for the bus authentication and transfers the encrypted random number cha to the public key decrypting unit 430.

The public key decrypting unit 430 obtains the random number cha by decrypting the encrypted random number cha using the secret key for the bus authentication memorized in the secret key memory unit for the bus authentication memory unit 420. The public key decrypting unit 430 encrypts the random number cha and the self secret key using the partner public key for the bus authentication, transfers the result of the encryption to the verification unit 540 and passes the random number cha and the secret key to the key calculating unit 440. The key calculating unit 440 calculates the session key K based on the random number cha and the secret key and passes it to the bus encryption unit 450. The bus encryption unit 450 encrypts the encrypted content key ring and sends the doubly encrypted content key ring to the DVD playback PC software 500.

On one hand, the verification unit 540 in the DVD playback PC software 500 verifies whether or not the random number cha obtained by decrypting with the self secret key matches the original random number cha, and when they match each other, the random number cha and the partner secret key are passed to the key calculating unit 550. The key calculating unit 550 calculates the session key K' using the random number cha and the partner secret key and passes to the bus decrypting unit 560. The bus decrypting unit 560 decrypts the doubly encrypted content key ring using the session key K', generates the encrypted content key ring and outputs the encrypted content key ring to the Dec processing unit 590.

On the other hand, the hashing function processing unit 570 calculates the hashing value Hash of the CRL outputted from the DVD drive and outputs the hashing value Hash to the Dec processing unit 590. The Dec processing unit 590 decrypts the content key to the encrypted value using the device key KD_A by calculating the exclusive OR between the encrypted content key ring and the hashing value Hash, and further decrypts the content key Kc by decrypting the device key KD_A and passes it to the Dec processing unit 595. The Dec processing unit 595 decrypts the encrypted content bound to the DVD 2a using the content key Kc and plays back the content.

Accordingly, the decrypting device 200i of the recording medium copyright protection system 1i according to the ninth embodiment, that is, the PC including the DVD drive 400 and the DVD playback PC software 500 should pass the CRL bound to the DVD 2a for getting a key for decrypting a content in return, as is the same case with the HD-DVD. As a result, it enables for the computers to eliminate an illegal descrambler 260 which conducts an unauthorized use such as a replacement of the CRL and the copyright is thus protected.

In addition, the decrypting device 200i, that is, when the case that a PC is connected to Internet, the decrypting device 200i accesses the terminal device 300 when the DVD2e plays back, downloads the latest CRL from the terminal device 300 and checks whether or not the DVD drive 400 is revoked in the public key validity checking unit 520 using the downloaded latest CRL.

The decrypting device 200i according to the ninth embodiment includes the DVD drive 400 and the DVD playback software 500, however, the DVD playback PC software only has, what we call, a "descramble" function. So, in this case, it is assumed that the decrypting device 200i should be used with connecting to the licensor supply protection module A. In other words, the PC should is be fixable for the IC card 210a and the decrypting device 200i, and the DVD drive 400 may be included in the IC card 210a and the DVD playback PC software partially in the Dec processing unit in this PC.

In that case, the content may be played back by decrypting the encrypted content read out from the DVD drive 400 after setting the SAC between the DVD drive 400 and the IC card 210a, and between the IC card 210a and the Dec processing unit 595 in the DVD playback PC software.

In addition, the encryption device 100a may further include the confirmation data outputting unit to output the confirmation data, which is to be a criterion for confirming whether or not the content key decrypted in the decrypting device 200i is the qualified key, to the DVD 2a. When the case that the confirmation data outputting unit functions as of outputting data as a confirmation data to the DVD2f and the data which is obtained by encrypting the predetermined fixed-pattern data using the content key memorized in the content key memory unit 113 or the case of outputting data as a confirmation data to the DVD2f and the data which is obtained by encrypting the content key using the content key, in corresponding to the terminal device 110a, the content key decrypting unit 220i includes the content decrypting key checking unit 228 that checks whether or not the content key is the qualified key, the content key checking unit 242, and the content decrypting key checking unit 244.

The copyright protection system for the present invention according to the embodiments is explained above. However, the present invention is not limited to those embodiments.

For example, in the above embodiment for the copyright protection system, the digital production is transmitted via the DVD medium, however, a system for transmitting the digital production via the transmission medium such as Internet is applicable to the present invention. In other words, it is applicable for a system by replacing the way of "recording to the record medium" to "sending to the transmission line", and "reading out from the recording medium" to "receiving from the transmission line", to the present invention.

In addition, the present invention is applicable for a system that transfers the digital production by combining a recording medium and a transmission medium. That is, an encrypted content may well be supplied by a recording medium such as DVD, and a key for decrypting the encrypted content and a CRL are supplied by a transmission medium, the network delivery. The reverse case, a key is to be supplied by the recording medium, and an encrypted content is to be supplied by a transmission medium, the network delivery, is also applicable. In this system that transfers the digital production by combining of the recording medium and the transmission medium, it is selectable what can be supplied by the recording medium within the encrypted contents and the keys, and what can be supplied by the transmission medium, the network delivery.

In the above embodiment, the copyright protection module (tamper tolerant module) is applied to the IC card 210a to 210f; however, a LSI 210i which integrates each configuration of IC card 210a to 210f to one chip can be applied and the LSI 210i may well be mounted to a socket 210j or mounted by soldering on to a board. Also, in the above embodiment, the IC card 210a to 210f is supplied by the copyright protection licensor, however, the IC card 210a to 210f manufactured by the manufacturer of the decrypting device 200a to 200f or the LSI 210i can be used in place of the IC card 210a to 210f.

Also, in the above embodiment, the copyright protection system according to the present invention is applied to a wide area between the encryption device 100a to 100f of the copyright protection licensor or the content manufacturer and the decrypting device 200a to 200f used by the user, however, the system is also applicable to a small area, such as domestic area or to the intranet when a processing of the cipher communication is executed.

The Tenth Embodiment

FIG. 17 is a block diagram that shows an overall configuration copyright protection system which establishes a cipher communication with the content via home LAN, and FIG. 18 is a block diagram that shows a construction of an AV server 100j, each plasma TV 200k, a VTR 200m, and a DVD recorder 200n of FIG. 17 and FIG. 18. In FIG. 18, since the construction of the plasma TV 200k, the VTR 200m, and the DVD recorder 200n are the same with the copyright protection system, only the plasma TV 200k is shown as an example.

The copyright protection system 1j includes a home LAN 30 as a transmission medium, an AV server 100j which connects to the home LAN 30, a plasma TV 200k as a client, a VTR 200m and a DVD recorder 200n.

Although the AV server 100j almost has the same components as the encryption device 100a, as shown in FIG. 1, the AV server 100j stores the content received from out-of-home in the content memory unit 161, which includes a HDD, and delivers the content by request of the memorized content delivery via the home LAN 30. This is the different point.

More specifically, the AV server 100j receives content from a broadcast station 100g via a broadcast (BS, CS) or broadcast network of a terrestrial broadcast 3a, from a server 100h of a content provider via internet network 3b, or from a CATV broadcast 100i via CATV network 3c, and memorizes the content to the content memory unit 161.

The AV server 100j includes a session key memory unit 112a. When delivering request of the content memorized in the content memory unit 161 from a client such as the plasma TV 200k is received, a SAC is formed between the plasma TV 200k based on the delivering request. A session key Kses, obtained when the SAC is formed, is memorized in the session key memory unit 112a and encrypts the content key Kc using the session key Kses in place of the device key used in the encryption device 100a. The encryption device 100a encrypts the content key Kc using the device key, that is, the session key Kses is used in place of the device key. This is the different point from the encryption device 100a.

On the other hand, the plasma TV 200k, the VTR 200m and the DVD recorder 200n are almost the same components with the decrypting device 200a as shown in FIG. 1, however, the plasma TV 200k, the VTR 200m and the DVD recorder 200n each include a session key memory unit 221a for memorizing a session key obtained when the SAC is formed between the AV server 100j, and decrypt the content key Kc using the session key Kses memorized in the session key memory unit 221a. This is the different point with the decrypting device 200a which decrypts the content key Kc using the device key KD_A.

A processing between the AV server 100j and the plasma TV 200k according to the copyright protection system 1j is to be described below with focusing on the different point with the copyright protection system 1a.

The AV server 100j conducts a SAC processing between the plasma TV 200k using an Elliptical Curve Cryptography (ECC) by request of the content delivery from a client, the DVD recorder 200n. The AV server 100j and the plasma TV 200k hold the same value session key Kses as each other. The AV server 100j memorizes the session key Kses in the session key memory unit 112a. The content key decrypting unit 220h, in the copyright protection module 210k of the plasma TV 200k, memorizes session key Kses to the session key memory unit 221a. The Ex-OR unit 115 in the AV server 100j carries out the exclusive OR between the session key Kses which is is shared between the plasma TV 200k and the hashing value of the CRL. The Enc unit 116 encrypts the content key Kc using a value obtained by the Ex-OR unit as a key. The Enc unit 162 encrypts a content which is a requested AV data using the content key. After the encryption of the content key and the content is finished, the AV server 100j sends the encrypted content key, the encrypted content and the CRL to the plasma TV 200k via the home LAN 30.

The copyright protection module 210k in the plasma TV 200k receives the CRL and the encrypted content which has been sent via the home LAN 30. The descrambler 260 receives the CRL and the encrypted content. The Ex-OR unit 223 in the content key decrypting unit 220h, which is in the copyright protection module 210k of the plasma TV 200k, carries out the exclusive OR between the session key Kses memorized in the session key memory unit 221a and the hashing value of the CRL obtained by the hashing function processing unit 222. The Dec processing unit 224 decrypts the content key using a value obtained in the Ex-OR unit 223 as a key.

A SAC processing is conducted between the copyright protection module 210k in the plasma TV 200k and the descrambler 260, based on the CRL, and the session key KK is shared.

The authentication unit 237 in the copyright protection module 210k encrypts the content key Kc using the shared session key KK and sends the content key Kc to the descrambler 260. The authentication unit 277 in the descrambler 260 decrypts the content key Kc. The Dec processing unit 280 decrypts the encrypted content with the obtained content key Kc.

Accordingly, it is easy to use the content for a client who uses a computer connected to a relatively small-scale network, such as domestic network or intranet. Furthermore, the copyright protection is strictly controlled on to the end user.

Also, in the tenth embodiment, the session key Kses is used in is place of the device key, however, a secret key Ks can be shared between the AV server 100j and the plasma TV 200k in advance, and be used in place of the session key. For checking up whether or not the decrypted content key is the qualified key, predetermined fixed pattern data described above can be sent with the CRL and determines in the copyright protection module 210k.

In addition, various kinds of encryption devices or decrypting devices are realized by combining the above processing of ten embodiments. That is, in the case of the encryption, (1) when we call each processing;

i. en encryption for a secret key ii. an transformation by the one-way function as a layer; it is selectable for the system to be double layered or triple layered, (2) as for a key for the encryption of the content, it is selectable for the key to be a content key or to be a function value obtained by transforming a medium ID in the one-way function, (3) as for the associating object for the hashing value of the CRL, it is selectable for the object to be the device key, the disk key, the content key, the medium ID, the session key or to be the function value obtained by transforming the medium ID in the one-way function. Accordingly, various forms of the encryption device, the decrypting device and the IC card are realized by combining the above independent three parameters (1), (2) and (3) arbitrary.

Also, a number of layers for the above encryption (or decrypting) of a secret key, etc., are not limited only 1 to 3. The layer can be exceeded of 3. In consideration of these variations, the encryption device, the decrypting device, and the IC module (secret key generation device) for the present invention is to be described as below.

That is, regarding an encryption method using a content key;

an encrypting method in an encryption device that encrypts a digital production and outputs the encrypted digital production to a recording medium or a transmission medium, the encrypting method includes:

(1) an encrypting step for repeating a chain encryption process, for a first secret key through an $(n-1)^{th}$ secret key, of encrypting the digital production using the first secret key out of n ($\geq 2$) secret keys and encrypting an $(i-1)^{th}$ secret key using an i ($2 \leq i \leq =n)^{th}$ secret key; and (2) an outputting step for outputting the encrypted first secret key through the $(n-1)^{th}$ secret key to the recording medium and the transmission medium, wherein the chain encryption process using at least one of the first secret key through the $n^{th}$ secret key includes a first step for transforming the secret key, prior to the encryption, using an attribute value dependent on details of a CRL which is an information list for specifying a revoked public key certificate.

Regarding an encryption method using the medium ID;

an encrypting method in an encryption device that encrypts a digital production and outputs the encrypted digital production to a recording medium or a transmission medium, the encrypting method includes:

(1) an encrypting step for repeating a chain encryption and transformation process, for a first secret key thorough an $(n-1)^{th}$ secret key, of transforming a medium identification information with a one-way function using the first secret key out of n ($\geq 1$) secret keys, encrypting the digital production using the transformed medium identification information, and in the case of n$\geq$2 encrypting an $(i-1)^{th}$ secret key using an i $(2 \leq i \leq n)^{th}$ secret key; and (2) an outputting step for outputting the encrypted first secret key through the $(n-1)^{th}$ secret key to the recording medium and the transmission medium, wherein the chain encryption or transformation process using at least one of the first secret key through the $n^{th}$ secret key includes a second step for (1) transforming the secret key, prior to the encryption, using an attribute valued dependent on details of a CRL which is an information list for specifying a revoked public key certificate, or (2) transforming the medium identification information obtained by the transformation with the attribute value.

Regarding the decrypting method using a content;

a decrypting method in a decrypting device that decrypts an encrypted digital production, the decrypting method includes:

(1) a first decrypting step for repeating a chain decrypting process, for n ($\geq 2$) encrypted secret keys, of obtaining the encrypted digital production, the n encrypted secret keys and a CRL which is an information list for specifying a revoked public key certificate via a recording medium or a transmission medium, and decrypting a first encrypted secret key out of the n encrypted secret keys using a pre-holding secret key, and further decrypting an encrypted second secret key with the obtained first secret key; and (2) a second decrypting step for decrypting the digital production with the $n^{th}$ secret key obtained by the final decrypting, wherein at least one of the chain decrypting processes using the first secret key through the $n^{th}$ secret key includes a third step for transforming the secret key used for the decrypting, prior to the decrypting, using an attribute value dependent on details of the CRL.

Regarding the decrypting method using a medium ID;

a decrypting method in a decrypting device that decrypts an encrypted digital production, the decrypting method includes:

(1) a first decrypting step for repeating a chain decrypting process, for n ($\geq 1$) encrypted secret keys, of obtaining the encrypted digital production, a medium identification information, n ($\geq 1$) encrypted secret keys and a CRL which is an information list for specifying a revoked public key certificate via a recording medium or a transmission medium, decrypting a first secret keys using a pre-holding secret key, and in the case of n ($\geq 2$), decrypting an encrypted second secret key with the obtained first secret key.

(2) a second decrypting step for transforming the medium identification information by a one-way function using the $n^{th}$ secret key used for the final decrypting, and decrypting the digital production with the transformed medium identification information, wherein at least one of the chain decrypting processes using the first secret key though the $n^{th}$ secret key or the transformation of the medium identification information includes a forth step for (1) transforming the secret key used for the decrypting or the transformation, prior to the decrypting or the transformation, using an attribute value dependent on details of the CRL or (2) transforming the medium identification information obtained by the transformation using the attribute value.

As stated above, the encryption device of the copyright protection system, the AV server, the decrypting device and the client can use a server, a set top box, a personal computer, a digital television, a VTR, a DVD recorder, a printer, a cellular phone and a personal digital assistance for delivering and receiving the content via the recording medium or the transmission medium as a computer device.

The invention claimed is:

1. A secret key generating device for outputting a secret key to a decrypting device, which decrypts, using the secret key, an encrypted digital production, the secret key generating device comprising:

an obtaining unit operable to obtain an encrypted first secret key and a CRL, from one of a recording medium and a transmission medium, the encrypted first secret key being generated by encrypting a first secret key using a transformed second secret key, the first secret key being used for encrypting the digital production, the CRL being an information list specifying a revoked public key certificate, the transformed second secret key being transformed from a second secret key using an attribute value calculated based on the CRL, and the second secret key being specific to the secret key generating device;

a second secret key memory unit operable to store the second secret key that is specific to the secret key generating device;

an attribute value calculating unit operable to calculate the attribute value based on the CRL obtained from the one of the recording medium and the transmission medium;

a transforming unit operable to transform the second secret key, using the attribute value calculated by the attribute value calculating unit and using the second secret key stored in the second secret key memory unit, into the transformed second secret key used for encrypting the first secret key;

a first decrypting unit operable to decrypt the encrypted first secret key, using the transformed second secret key transformed by the transforming unit, to obtain the first secret key; and an outputting unit operable to output, to the decrypting device, the first secret key obtained by the first decrypting unit, as the secret key used for decrypting the encrypted digital production, wherein the encrypted first secret key is associated with the CRL via the transformed second secret key.

2. The secret key generating device according to claim 1, further comprising a verification unit operable to verify whether or not the first secret key obtained by the first decrypting unit is qualified-for encrypting the digital production.

3. The secret key generating device according to claim 2, wherein the verification unit includes:

a confirmation data obtaining unit operable to obtain confirmation data, which is a criterion for verifying whether or not the first secret key is qualified, the confirmation data being obtained from one of the recording medium and the transmission medium; and a confirmation data decrypting unit operable to decrypt the obtained confirmation data using the first secret key obtained by the first decrypting unit, wherein the verification unit is operable to verify whether or not the decrypted confirmation data obtained by the confirmation data decrypting unit matches predetermined fixed-pattern data, and is operable to determine that the first secret key is qualified upon the verification unit verifying that the decrypted confirmation data matches the predetermined fixed-pattern data.

4. The secret key generating unit according to claim 2, wherein the verification unit includes:

a confirmation data obtaining unit operable to obtain confirmation data, which is a criterion for verifying whether or not the first secret key is qualified, the confirmation data being obtained from one of the recording medium and the transmission medium; and a first secret key encryption unit operable to encrypt the first secret key obtained by the first decrypting unit using the first secret key, wherein the verification unit is operable to verify whether or not the first secret key encrypted by the first secret key encryption unit matches the confirmation data obtained by the confirmation data obtaining unit, and is operable to determine that the first secret key is qualified upon the verification unit verifying that the first secret key encrypted by the first secret key encryption unit matches the confirmation data.

5. The secret key generating unit according to claim 2, wherein the verification unit includes:

a confirmation data obtaining unit operable to obtain confirmation data, which is a criterion verifying whether or not the first secret key is qualified, the confirmation data being obtained from one of the recording medium and the transmission medium; and a confirmation data decrypting unit operable to decrypt the obtained confirmation data using the first secret key obtained by the first decrypting unit, wherein the verification unit is operable to verify whether or not a value obtained by the confirmation data decrypting unit decrypting the confirmation data matches the first secret key obtained by the first decrypting unit, and is operable to determine that the first secret key is qualified upon the verification unit verifying that the value obtained by the confirmation data decrypting unit matches the first secret key obtained by the first decrypting unit.

6. The secret key generating device according to claim 1, wherein the attribute value calculating unit calculates a hashing value of the CRL, as the attribute value, and the transforming unit transforms the second secret key into the transformed second secret key by carrying out an exclusive OR between the second secret key and the hashing value.

7. A secret key generating device for outputting a secret key to a decrypting device, which decrypts, using the secret key, an encrypted digital production, the secret key generating device comprising:

an obtaining unit operable to obtain an encrypted first secret key and a CRL, from one of a recording medium and a transmission medium, the encrypted first secret key being associated with a transformed first secret key, the first secret key being used for encrypting the digital production, the CRL being an information list specifying a revoked public key certificate, the transformed first secret key being transformed from a first secret key using an attribute value calculated based on the CRL, the first secret key being encrypted using a second secret key, and the second secret key being specific to the secret key generating device;

a second secret key memory unit operable to store the second secret key that is specific to the secret key generating device;

a first decrypting unit operable to decrypt the encrypted first secret key, using the second secret key stored-in the second secret key memory unit, to obtain the first secret key;

an attribute value calculating unit operable to calculate the attribute value based on the CRL obtained from the one of the recording medium and the transmission medium;

a transforming unit operable to transform the first secret key, using the attribute value calculated by the attribute value calculating unit and using the first secret key obtained by the first decrypting unit, into the transformed first secret key used for encrypting the digital production; and an outputting unit operable to output, to the decrypting device, the transformed first secret key transformed by the transforming unit, as the secret key used for decrypting the encrypted digital production, wherein the encrypted first secret key is associated with the CRL via the transformed first secret key.

8. The secret key generating device according to claim 7, further comprising a verification unit operable to verify whether or not the first secret key transformed by the transforming unit is qualified for encrypting of the digital production.

9. The secret key generating device according to claim 8, wherein the verification unit includes:
   a confirmation data obtaining unit operable to obtains confirmation data, which is a criterion for verifying whether or not the first secret key is qualified, the confirmation data being obtained from one of the recording medium and the transmission medium;
   a confirmation data decrypting unit operable to decrypt the obtained confirmation data using the transformed first secret key transformed by the transforming unit,
   wherein the verification unit is operable to verify whether or not the decrypted confirmation data obtained by the confirmation data decrypting unit matches predetermined fixed-pattern data, and is operable to determine that the first secret key is qualified upon the verification unit verifying that the decrypted confirmation data matches the predetermined fixed-pattern data.

10. The secret key generating device according to claim 8, wherein the verification unit includes:
    a confirmation data obtaining unit operable to obtain confirmation data, which is a criterion for verifying whether or not the first secret key is qualified, the confirmation data being obtained from one of the recording medium and the transmission medium; and
    a first secret key encryption unit operable to encrypt the transformed first secret key transformed by the transforming unit using the first secret key,
    wherein the verification unit is operable to verify whether or not the first secret key encrypted by the first secret key encryption unit matches the confirmation data obtained by the confirmation data obtaining unit, and is operable to determine that the first secret key is qualified upon the verification unit verifying that the first secret key encrypted by the first secret key encryption unit matches the confirmation data.

11. The secret key generating device according to claim 8, wherein the verification unit includes:
    a confirmation data obtaining unit operable to obtain confirmation data, which is a criterion for verifying whether or not the first secret key is qualified, the confirmation data being obtained from one of the recording medium and the transmission medium; and
    a confirmation data decrypting unit operable to decrypt the obtained confirmation data using the transformed first secret key transformed by the transforming unit,
    wherein the verification unit is operable to verify whether or not a value obtained by the confirmation data decrypting unit decrypting the confirmation data matches the transformed first secret key transformed by the transforming unit, and is operable to determine that the first secret key is qualified upon the verification unit verifying that the value obtained by the confirmation data decrypting unit matches the first secret key obtained by the first decrypting unit.

12. A secret key generating device for outputting a secret key to a decrypting device, which decrypts, using the secret key, an encrypted digital production, the secret key generating device comprising:
    an obtaining unit operable to obtain medium identification information and a CRL, from one of a recording medium and a transmission medium, the medium identification information being associated with a secret key, the secret key being used for encrypting the digital production, the CRL being an information list specifying a revoked public key certificate, the secret key being generated based on the medium identification information and a transformed first secret key, the transformed first secret key being transformed from the first secret key using an attribute value calculated based on the CRL, and the first secret key being specific to the decrypting device;
    a first secret key memory unit operable to store the first secret key that is specific to the decrypting device;
    an attribute value calculating unit operable to calculate the attribute value based on the CRL obtained from the one of the recording medium and the transmission medium;
    a transforming unit operable to transform the first secret key, using the attribute value calculated by the attribute value calculating unit and using the first secret key stored in the first secret key memory unit, into the transformed first secret key;
    a function transformation unit operable to transform the medium identification information obtained by the obtaining unit and the transformed first secret key transformed by the transforming unit, by inputting the medium identification information and the transformed first secret key into a one-way function; and
    an outputting unit operable to output, to the decrypting device, the function value obtained from the function transformation unit, as the secret key used for decrypting the encrypted digital production,
    wherein the medium identification information is associated with the CRL via the transformed first secret key.

13. A secret key generating device for outputting a secret key to a decrypting device, which decrypts, using the secret key, an encrypted digital production, the secret key generating device comprising:
    an obtaining unit operable to obtain medium identification information and a CRL, from one of a recording medium and a transmission medium, the medium identification information being associated with a secret key, the secret key being used for encrypting the digital production, the CRL being an information list specifying a revoked public key certificate, the secret key being generated as a transformed function value, the transformed function value being transformed from a function value using an attribute value calculated based on the CRL, the function value being calculated based on the medium identification information and a first secret key using a one-way function, and the first secret key being specific to the decrypting device;
    a first secret key memory unit operable to store the first secret key that is specific to the decrypting device;
    a function transformation unit operable to transform the medium identification information obtained from the obtaining unit and the first secret key stored in the first secret key memory unit, by inputting the medium identification information and the first secret key into the one-way function;
    an attribute value calculating unit operable to calculate the attribute value based on the CRL obtained from the one of the recording medium and the transmission medium;
    a transforming unit operable to transform the function value, using the attribute value calculated by the attribute value calculating unit and the function value, into the transformed function value; and
    an outputting unit operable to output, to the decrypting device, the transformed attribute value transformed by the transforming unit, as the secret key used for decrypting the encrypted digital production,
    wherein the medium identification information is associated with the CRL via the transformed function value.

14. A secret key generating device for outputting a secret key to a decrypting device which decrypts, using the secret key, an encrypted digital production, the secret key generating device comprising:

an obtaining unit operable to obtain an encrypted first secret key, an encrypted second secret key and a CRL, from one of a recording medium and a transmission medium, the encrypted first secret key being generated by encrypting a first secret key using a second secret key, the first secret key being used for encrypting the digital production, the encrypted second secret key being generated by encrypting the second secret key using a transformed third secret key, the second secret key being used for encrypting the first secret key, the CRL being an information list specifying a revoked public key certificate, the transformed third secret key being transformed from a third secret key using an attribute value calculated based on the CRL, and the third secret key being specific to the secret key generating device;

a third secret key memory unit operable to store the third secret key that is specific to the secret key generating device;

an attribute value calculating unit operable to calculate the attribute value based on the CRL obtained from the one of the recording medium and the transmission medium;

a transforming unit operable to transform the third secret key, using the attribute value calculated by the attribute value calculating unit and using the third secret key stored in the third secret key memory unit, into the transformed third secret key used for encrypting the second secret key;

a first decrypting unit operable to decrypt the encrypted second secret key, using the transformed third secret key transformed by the transforming unit, to obtain the second secret key;

a second decrypting unit operable to decrypt the encrypted first secret key, using the second secret key obtained by the first decrypting unit, to obtain the first secret key; and an outputting unit operable to output, to the decrypting device, the first secret key obtained by the second decrypting unit, as the secret key used for decrypting the encrypted digital production, wherein the encrypted second secret key is associated with the CRL via the transformed third secret key.

15. The secret key generating device according to claim 14, further comprising a verification unit operable to verify whether or not the second secret key obtained by the first decrypting unit is qualified for encrypting the second secret key.

16. The secret key generating device according to claim 15, wherein the verification unit includes:

a confirmation data obtaining unit operable to obtain confirmation data, which is a criterion for verifying whether or not the second secret key is qualified, the confirmation data being obtained from one of the recording medium and the transmission medium; and a confirmation data decrypting unit operable to decrypt the obtained confirmation data using the second secret key obtained by the first decrypting unit, wherein the verification unit is operable to verify whether or not the decrypted confirmation data obtained by the confirmation data decrypting unit matches predetermined fixed-pattern data, and is operable to determine that the second secret key is qualified upon the verification unit verifying that the decrypted confirmation data matches the predetermined fixed-pattern data.

17. The secret key generating unit according to claim 15, wherein the verification unit includes:

a confirmation data obtaining unit operable to obtain confirmation data, which is a criterion for verifying whether or not the second secret key is qualified, the confirmation data being obtained from one of the recording medium and the transmission medium; and a second secret key encryption unit operable to encrypt the second secret key obtained by the first decrypting unit using the second secret key, wherein the verification unit is operable to verify whether or not the second secret key encrypted by the second secret key encryption unit matches the confirmation data obtained by the confirmation data obtaining unit, and is operable to determine that the second secret key is qualified upon the verification unit verifying that the second secret key encrypted by the second secret key encryption unit matches the confirmation data.

18. The secret key generating unit according to claim 15, wherein the verification unit includes:

a confirmation data obtaining unit operable to obtain confirmation data, which is a criterion for verifying whether or not the second secret key is qualified, the confirmation data being obtained from one of the recording medium and the transmission medium; and a confirmation data decrypting unit operable to decrypt the obtained confirmation data-using the second secret key obtained by the first decrypting unit, wherein the verification unit is operable to verify whether or not a value obtained by the confirmation data decrypting unit decrypting the confirmation data matches the second secret key obtained by the first decrypting unit, and is operable to determine that the second secret key is qualified upon the verification unit verifying that the value obtained by the confirmation data decrypting unit matches the second secret key obtained by the first decrypting unit.

19. A secret key generating device for outputting a secret key to a decrypting device which decrypts, using the secret key, an encrypted digital production, the secret key generating device comprising:

an obtaining unit operable to obtain an encrypted first secret key, an encrypted second secret key, and a CRL, from one of a recording medium and a transmission medium, the encrypted first secret key being generated by encrypting a first secret key using a transformed second secret key, the first secret key being used for encrypting the digital production, the encrypted second secret key being associated with the transformed second secret key, the CRL being an information list specifying a revoked public key certificate, the transformed second secret key being transformed from the second secret key using an attribute value calculated based on the CRL, the second secret key being encrypted using a third secret key, and the third secret key being specific to the secret key generating device;

a third secret key memory unit operable to store the third secret key that is specific to the secret key generating device;

a first decrypting unit operable to decrypt the encrypted second secret key, using the third secret key stored in the third secret key memory unit, to obtain the second key;

an attribute value calculating unit operable to calculate the attribute value based on the CRL obtained from the one of the recording medium and the transmission medium;

a transforming unit operable to transform the second secret key, using the attribute value calculated by the attribute value calculating unit and using the second secret key obtained by the first decrypting unit, into the transformed second secret key used for encrypting the digital production;

a second decrypting unit operable to decrypt the encrypted first secret key, using the transformed second secret key transformed by the transforming unit, to obtain the first secret key; and an outputting unit operable to output, to the decrypting device, the first secret key obtained by the second decrypting unit, as the secret key used for decrypting the encrypted digital production, wherein the encrypted first secret key is associated with the CRL via the transformed second secret key.

20. A secret key generating device for outputting a secret key to a decrypting device which decrypts, using the secret key, an encrypted digital production, the secret key generating device comprising:

an obtaining unit operable to obtain medium identification information, an encrypted first secret key, and a CRL, from one of a recording medium and a transmission medium, a function value being used a secret key for encrypting the digital production, the function value being calculated using a one-way function based on the medium identification information and the first secret key, the encrypted first secret key being generated by encrypting the first secret key using the transformed second secret key, the CRL being an information list specifying a revoked public key certificate, the transformed second secret key being transformed from a second secret key using an attribute value calculated based on the CRL, and the second secret key being specific to the secret key generating device;

a second secret key memory unit operable to store the second secret key that is specific to the secret key generating device;

an attribute value calculating unit operable to calculate the attribute value based on the CRL obtained from the one of the recording medium and the transmission medium;

a transforming unit operable to transform the second secret key, using the attribute value calculated by the attribute value calculating unit and using the second secret key stored in the second secret key memory unit, into the transformed second secret key;

a first decrypting unit operable to decrypt the encrypted first secret key, using the transformed second secret key transformed by the transforming unit, to obtain the first secret key;

a function transformation unit operable to transform the medium identification information obtained from the obtaining unit and the first secret key obtained by the first decrypting unit, by inputting the medium identification information obtained from the obtaining unit and the first secret key into the one-way function; and an outputting unit operable to output, to the decrypting device, the function value obtained by the function transformation unit, as the secret key used for decrypting the digital production, wherein the medium identification information is associated with the encrypted first secret key and the CRL via the transformed second secret key.

21. The secret key generating device according to claim 20, further comprising a verification unit operable to verify whether or not the first secret key obtained by the first decrypting unit is qualified for encrypting the medium identification information.

22. The secret key generating device according to claim 21, wherein the verification unit includes:

a confirmation data obtaining unit operable to obtain confirmation data, which is a criterion for verifying whether or not the first secret key is qualified, the confirmation data being obtained from one of the recording medium and the transmission medium; and a confirmation data decrypting unit operable to decrypt the obtained confirmation data using the first secret key obtained by the first decrypting unit, wherein the verification unit is operable to verify whether or not the decrypted confirmation data obtained by the confirmation data decrypting unit matches predetermined fixed-pattern data, and is operable to determine that the first secret key is qualified upon the verification unit verifying that the decrypted confirmation data matches the predetermined fixed-pattern data.

23. The secret key generating unit according to claim 21, wherein the verification unit includes:

a confirmation data obtaining unit operable to obtain confirmation data, which is a criterion for verifying whether or not the first secret key is qualified, the confirmation data being obtained from one of the recording medium and the transmission medium; and a first secret key encryption unit operable to encrypt the first secret key obtained by the first decrypting unit using the first secret key, wherein the verification unit is operable to verify whether or not the first secret key encrypted by the first secret key encryption unit matches the confirmation data obtained by the confirmation data obtaining unit, and is operable to determine that the first secret key is qualified upon the verification unit verifying that the first secret key encrypted by the first secret key encryption unit matches the confirmation data.

24. The secret key generating unit according to claim 21, wherein the verification unit includes:

a confirmation data obtaining unit operable to obtain confirmation data, which is a criterion for verifying whether or not the first secret key is qualified, the confirmation being obtained from one of the recording medium and the transmission medium; and a confirmation data decrypting unit operable to decrypt the obtained confirmation data using the first secret key obtained by the first decrypting unit, wherein the verification unit is operable to verify whether or not a value obtained by the confirmation data decrypting unit decrypting the confirmation data matches the first secret key obtained by the first decrypting unit, and is operable to determine that the first secret key is qualified upon the verification unit verifying that the value obtained by the confirmation data decrypting unit matches the first secret key obtained by the first decrypting unit.

25. A secret key generating device for outputting a secret key to a decrypting device, which decrypts, using the secret key, an encrypted digital production, the secret key generating device comprising:

an obtaining unit operable to obtain medium identification information, an encrypted first secret key, and a CRL from one of a recording medium and a transmission medium, a transformed function value being used as a secret key for encrypting the digital production, the CRL being an information list specifying a revoked public key certificate, the transformed function value being transformed from a function value using an attribute value calculated based on the CRL, the function value being calculated using a one-way function based on the medium identification information and a first secret key, the encrypted first secret key being generated by encrypting the first secret key using a second secret key, and the second secret key being specific to the secret key generating device;

a second secret key memory unit operable to store the second secret key that is specific to the decrypting device;

a first decrypting unit operable to decrypt the encrypted first secret key, using the second secret key stored in the second secret key memory unit;

a function transformation unit operable to transform the medium identification information obtained from the obtaining unit and the first secret key decrypted by the first decrypting unit, by inputting the medium identification information and the first secret key into a one-way function;

an attribute value calculating unit operable to calculate the attribute value based on the CRL obtained from the one of the recording medium and the transmission medium;

a transforming unit operable to transform the function value, using the attribute value calculated by the attribute value calculating unit and transformed by the function transformation unit, into the transformed function value; and an outputting unit operable to output, to the decrypting device, the transformed function value obtained from the function transformation unit, as the secret key for decrypting the encrypted digital production, wherein the medium identification information is associated with the encrypted first secret key and the CRL via the transformed function value.

* * * * *